US011018911B2

(12) United States Patent
Czempas

(10) Patent No.: US 11,018,911 B2
(45) Date of Patent: May 25, 2021

(54) APPARATUS FOR MEASURING A PHYSICAL PARAMETER AND METHOD OF OPERATING SUCH APPARATUS

(71) Applicant: Helmut Fischer GmbH Institut fuer Elektronik und Messtechnik, Sindelfingen (DE)

(72) Inventor: Dominic Czempas, Karlsruhe (DE)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 0 days.

(21) Appl. No.: 16/680,811

(22) Filed: Nov. 12, 2019

(65) Prior Publication Data

US 2020/0177421 A1   Jun. 4, 2020

(30) Foreign Application Priority Data

Nov. 29, 2018  (EP) .................................. 18209295

(51) Int. Cl.
*H04L 27/14* (2006.01)
*H04B 17/20* (2015.01)
*H04B 1/16* (2006.01)

(52) U.S. Cl.
CPC ............... *H04L 27/14* (2013.01); *H04B 1/16* (2013.01); *H04B 17/20* (2015.01)

(58) Field of Classification Search
CPC ........................................... H04L 27/14
USPC ........................................ 375/224
See application file for complete search history.

(56) References Cited

U.S. PATENT DOCUMENTS

| 3,757,132 A | * | 9/1973 | Nilsson | H04Q 1/44 307/106 |
| 4,283,794 A | * | 8/1981 | Underhill | G01R 27/16 324/619 |
| 4,608,559 A | * | 8/1986 | Friedman | H04L 12/2801 370/462 |
| 4,716,397 A | | 12/1987 | Werba et al. | |
| 4,726,039 A | * | 2/1988 | Piesinger | H04L 27/2017 332/105 |
| 5,134,386 A | | 7/1992 | Swanic | |

(Continued)

OTHER PUBLICATIONS

Extended European Search Report for Application No. 18209295.7 dated Mar. 23, 2019.

*Primary Examiner* — Lihong Yu
(74) *Attorney, Agent, or Firm* — Harness, Dickey & Pierce, P.L.C.

(57) ABSTRACT

An apparatus includes a series connection of at least a first impedance and a second impedance, the first impedance having a first terminal and a second terminal and the second impedance having a first terminal and a second terminal. The second terminal of the first impedance is connected to the first terminal of the second impedance forming a first node. The apparatus further includes a signal generator to apply a first amplitude modulated signal to the first terminal of the first impedance and a second amplitude modulated signal to the second terminal of the second impedance; and further includes an evaluation device configured to receive a first measurement signal from the first node and to determine information on the at least one physical parameter depending on the first measurement signal.

18 Claims, 19 Drawing Sheets

(56) References Cited

U.S. PATENT DOCUMENTS

| | | | |
|---|---|---|---|
| 6,008,691 A | * | 12/1999 | Morita .................. H03H 11/46 327/552 |
| 2010/0066347 A1 | | 3/2010 | Nakamura et al. |
| 2012/0085176 A1 | | 4/2012 | Morales et al. |

* cited by examiner

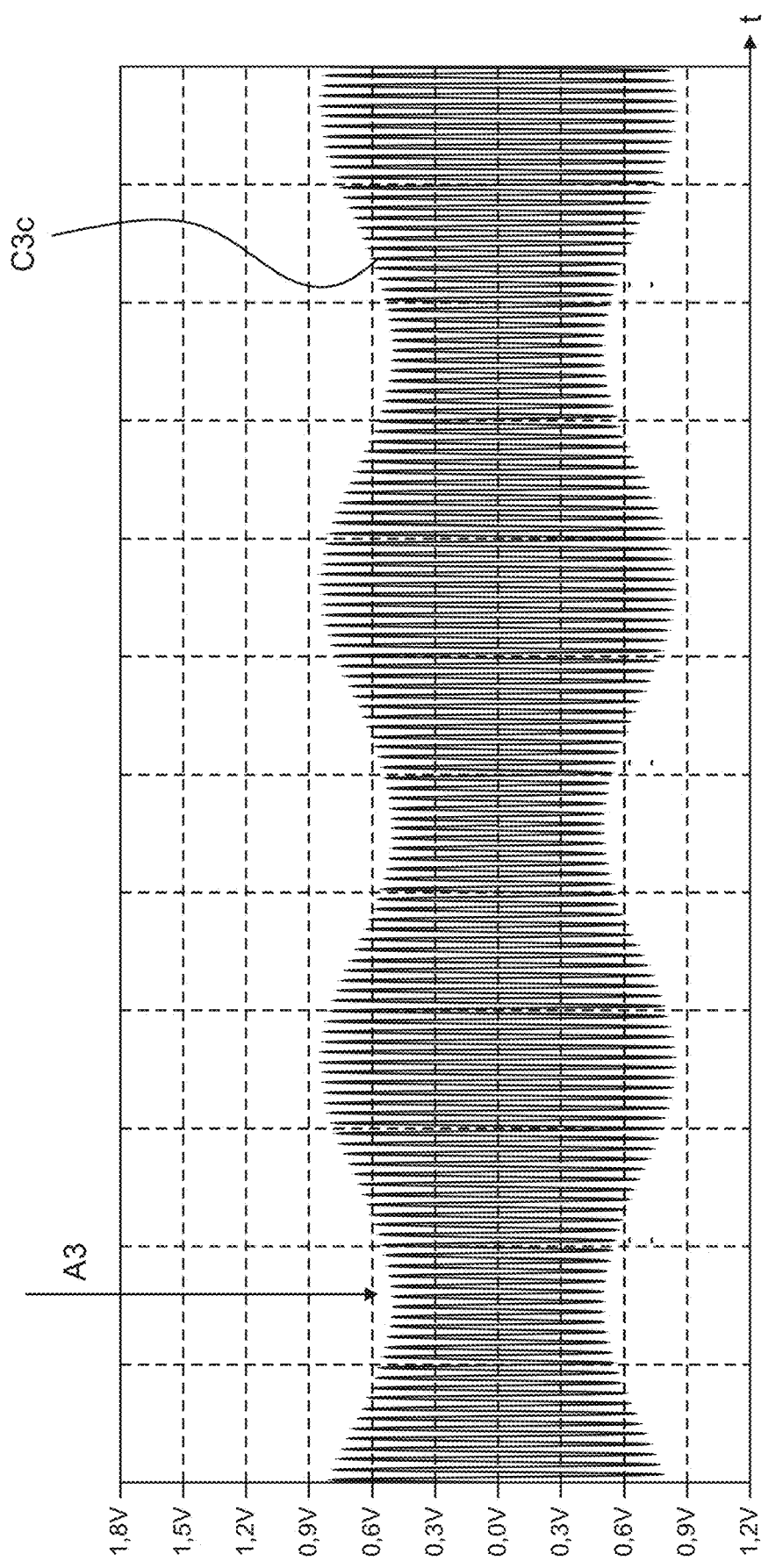

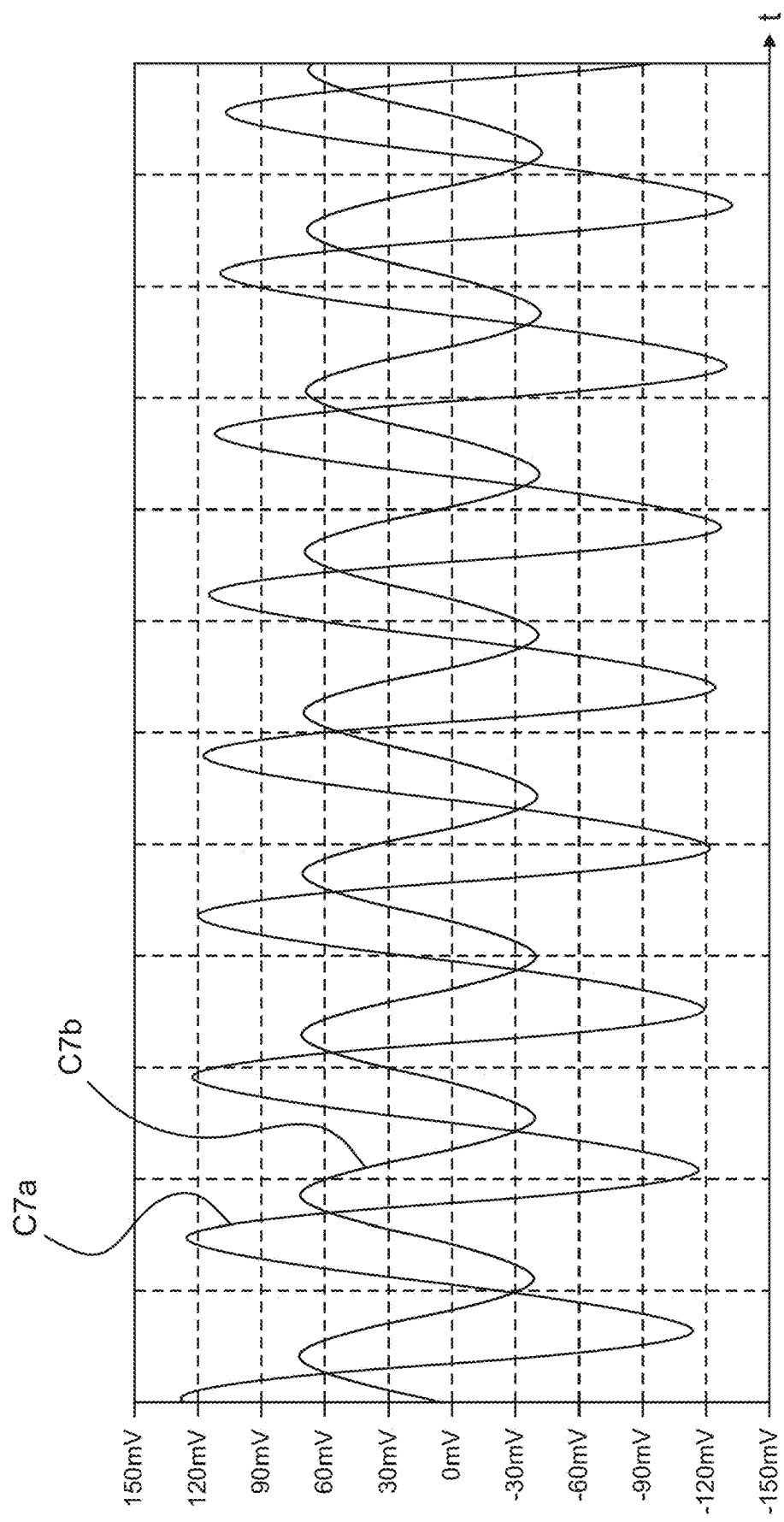

ND METHOD OF
APPARATUS FOR MEASURING A PHYSICAL PARAMETER AND METHOD OF OPERATING SUCH APPARATUS

PRIORITY STATEMENT

The present application hereby claims priority under 35 U.S.C. § 119 to European patent application number EP18209295.7 filed Nov. 29, 2018, the entire contents of which are hereby incorporated herein by reference.

FIELD

Embodiments of the disclosure generally relate to an apparatus for measuring a physical parameter comprising a series connection of at least a first impedance and a second impedance, wherein the first impedance has a first terminal and a second terminal, wherein an impedance value of at least the first impedance depends on the physical parameter, wherein the second impedance has a first terminal and a second terminal, and wherein the second terminal of the first impedance is connected to the first terminal of the second impedance forming a first node.

Embodiments of the disclosure further generally relate to a method of operating such apparatus.

BACKGROUND

Conventional apparatus and methods of the abovementioned type may be used for measuring a physical parameter, for example by evaluating a signal that can be obtained at the first node. A change of the physical parameter usually leads to a change of the impedance value of at least the first impedance, which can be detected by the evaluation. The conventional approaches lack operational flexibility because measurements can only be performed at a single frequency. Also, a precise evaluation of the signal is complex and costly for high frequencies since components with a comparatively high bandwidth of operation are required.

SUMMARY

In view of this, some embodiments provide an improved apparatus for measuring a physical parameter comprising a series connection of at least a first impedance and a second impedance, wherein the first impedance has a first terminal and a second terminal, wherein an impedance value of at least the first impedance depends on the physical parameter, wherein the second impedance has a first terminal and a second terminal, and wherein the second terminal of the first impedance is connected to the first terminal of the second impedance forming a first node, wherein the apparatus further comprises a signal generator configured to apply a first amplitude modulated signal to the first terminal of the first impedance and a second amplitude modulated signal to the second terminal of the second impedance, the apparatus further comprising an evaluation device configured to receive a first measurement signal from the first node and to determine information on the at least one physical parameter depending on the first measurement signal. This approach increases operational flexibility and enables to perform measurements with comparatively high frequencies. At the same time, for the evaluation, components with a comparatively high bandwidth of operation, e.g. corresponding to the frequency range in which measurements are performed, are not required.

According to preferred embodiments, the first amplitude modulated signal and the second amplitude modulated signal comprise the same carrier frequency, which further reduces complexity as e.g. a single signal source may be used for providing a carrier signal having the carrier frequency.

According to further preferred embodiments, the first impedance and the second impedance may comprise at least one inductive element each, for example a coil. According to further preferred embodiments, the first impedance and the second impedance may also comprise at least one capacitive or resistive element each, or any other type of electrical element an impedance value of which may depend on a physical parameter, e.g. of an object to be measured (e.g. an optical sensor). As an example, if the first impedance and the second impedance comprise at least one inductive element (e.g., a coil) each, the presence or absence of an electrically conductive element at a position close to at least the first impedance may be detected. Also, by evaluating the first measurement signal, more detailed information may be determined, such as e.g. a thickness of an electrically conductive layer present on an object which is close to the first impedance.

According to further preferred embodiments, the signal generator is configured to selectively provide the first amplitude modulated signal and the second amplitude modulated signal with a predetermined carrier frequency. While for both the first amplitude modulated signal and the second amplitude modulated signal preferably the (same) carrier frequency is used, according to further preferred embodiments, this carrier frequency may be varied arbitrarily, which enables to perform measurements at respective different frequencies. This way, e.g. when using inductive elements as the first impedance and the second impedance, measurements in different depths of an object to be measured may be made, as the skin depth is dependent on frequency.

According to further preferred embodiments, the signal generator is configured to sweep the carrier frequency, so that measurements may be made within a predetermined frequency range that is covered by the sweep.

According to further preferred embodiments, the signal generator is configured to at least temporarily obtain the first amplitude modulated signal by multiplying a first carrier signal having a or the carrier frequency with a periodic first control signal and/or to at least temporarily obtain the second amplitude modulated signal by multiplying a second carrier signal having the (same) carrier frequency with a periodic second control signal, wherein preferably the second carrier signal has a predetermined first phase shift with respect to the first carrier signal, wherein preferably the second control signal has a predetermined second phase shift with respect to the first control signal. This enables a particularly efficient evaluation of the first measurement signal.

According to further preferred embodiments, the first phase shift and/or the second phase shift is 90 degrees or a multiple of 90 degrees.

As mentioned above, the signal generator is configured to at least temporarily obtain the first amplitude modulated signal and the second amplitude modulated signal in the way explained above. For instance, in a first mode of operation, the first amplitude modulated signal and the second amplitude modulated signal may be obtained as explained above, while in a second mode of operation, the first amplitude modulated signal and the second amplitude modulated signal may be obtained in a different way, e.g. according to further embodiments as exemplarily disclosed in the following paragraphs.

According to further preferred embodiments, the signal generator is configured to at least temporarily obtain the first amplitude modulated signal by adding a third carrier signal having a or the carrier frequency with a periodic third control signal and/or to at least temporarily obtain the second amplitude modulated signal by adding a fourth carrier signal having the carrier frequency with a periodic fourth control signal, wherein preferably the fourth carrier signal has a predetermined third phase shift with respect to the third carrier signal, and wherein preferably the fourth control signal has a predetermined fourth phase shift with respect to the third control signal.

According to further preferred embodiments, the third phase shift is 180 degrees, wherein preferably the fourth phase shift is zero.

According to further preferred embodiments, the evaluation device comprises an envelope demodulator and/or a bandpass filter and/or a high-pass filter for processing the first measurement signal, whereby a first processed signal is obtained.

According to further preferred embodiments, the evaluation device comprises a control circuit for providing a compensation signal, wherein the compensation signal is determined such that a sum of the first processed signal and the compensation signal is zero. According to further preferred embodiments, the control circuit may comprise a closed-loop control configured to receive the sum of the first processed signal and the compensation signal and configured to influence the compensation signal depending on the sum signal. Advantageously, the closed-loop control inter alia contributes to providing a temperature-independent, stable evaluation with high precision.

Further preferred embodiments relate to a method of operating an apparatus for measuring a physical parameter, the apparatus comprising a series connection of at least a first impedance and a second impedance, wherein the first impedance has a first terminal and a second terminal, wherein an impedance value of at least the first impedance depends on the physical parameter, wherein the second impedance has a first terminal and a second terminal, and wherein the second terminal of the first impedance is connected to the first terminal of the second impedance forming a first node, wherein the method comprises the following steps: applying, by means of a signal generator, a first amplitude modulated signal to the first terminal of the first impedance and a second amplitude modulated signal to the second terminal of the second impedance, receiving, by an evaluation device, a first measurement signal from the first node, and determining information on the at least one physical parameter depending on the first measurement signal.

According to further preferred embodiments, the first amplitude modulated signal and the second amplitude modulated signal comprise the same carrier frequency.

According to further preferred embodiments, the signal generator selectively provides the first amplitude modulated signal and the second amplitude modulated signal with a predetermined carrier frequency, wherein preferably the signal generator sweeps the carrier frequency.

According to further preferred embodiments, the signal generator at least temporarily obtains the first amplitude modulated signal by multiplying a first carrier signal having a or the carrier frequency with a periodic first control signal and at least temporarily obtains the second amplitude modulated signal by multiplying a second carrier signal having the carrier frequency with a periodic second control signal, wherein the second carrier signal has a predetermined first phase shift with respect to the first carrier signal, and wherein the second control signal has a predetermined second phase shift with respect to the first control signal.

According to further preferred embodiments, the first phase shift and/or the second phase shift is 90 degrees or a multiple of 90 degrees.

According to further preferred embodiments, the signal generator at least temporarily obtains the first amplitude modulated signal by adding a third carrier signal having a or the carrier frequency with a periodic third control signal and at least temporarily obtains the second amplitude modulated signal by adding a fourth carrier signal having the carrier frequency with a periodic fourth control signal, wherein the fourth carrier signal has a predetermined third phase shift with respect to the third carrier signal, and wherein the fourth control signal has a predetermined fourth phase shift with respect to the third control signal.

According to further preferred embodiments, the third phase shift is 180 degrees, and the fourth phase shift is zero.

According to further preferred embodiments, the evaluation device processes the first measurement signal by means of an envelope demodulator and/or a bandpass filter and/or a high-pass filter, whereby a first processed signal is obtained.

According to further preferred embodiments, the evaluation device provides, by means of a control circuit, a compensation signal, wherein the compensation signal is determined such that a sum of the first processed signal and the compensation signal is zero.

According to further preferred embodiments, the steps of applying, receiving, and determining are repeated for a predetermined number of measurements, wherein for each of the predetermined number of measurements a different carrier frequency is used. This way, the principle according to the embodiments may be employed for a predetermined number or range of carrier frequencies, whereby detailed information on the physical parameter may be obtained.

Further preferred embodiments relate to an apparatus, particularly for measuring a physical parameter, comprising a sensor element, wherein the sensor element preferably comprises at least a first impedance an impedance value of which depends on the physical parameter, wherein the apparatus further comprises a signal generator configured to apply an amplitude modulated signal to the sensor element, preferably to the at least first impedance, the apparatus further comprising a demodulator for demodulating an output signal of the sensor element to obtain a demodulated signal and an evaluation circuit configured to evaluate the demodulated signal.

BRIEF DESCRIPTION OF THE FIGURES

Further features, aspects and advantages of the embodiments are given in the following detailed description with reference to the drawings in which.

DETAILED DESCRIPTION OF THE EXAMPLE EMBODIMENTS

Figure 1:
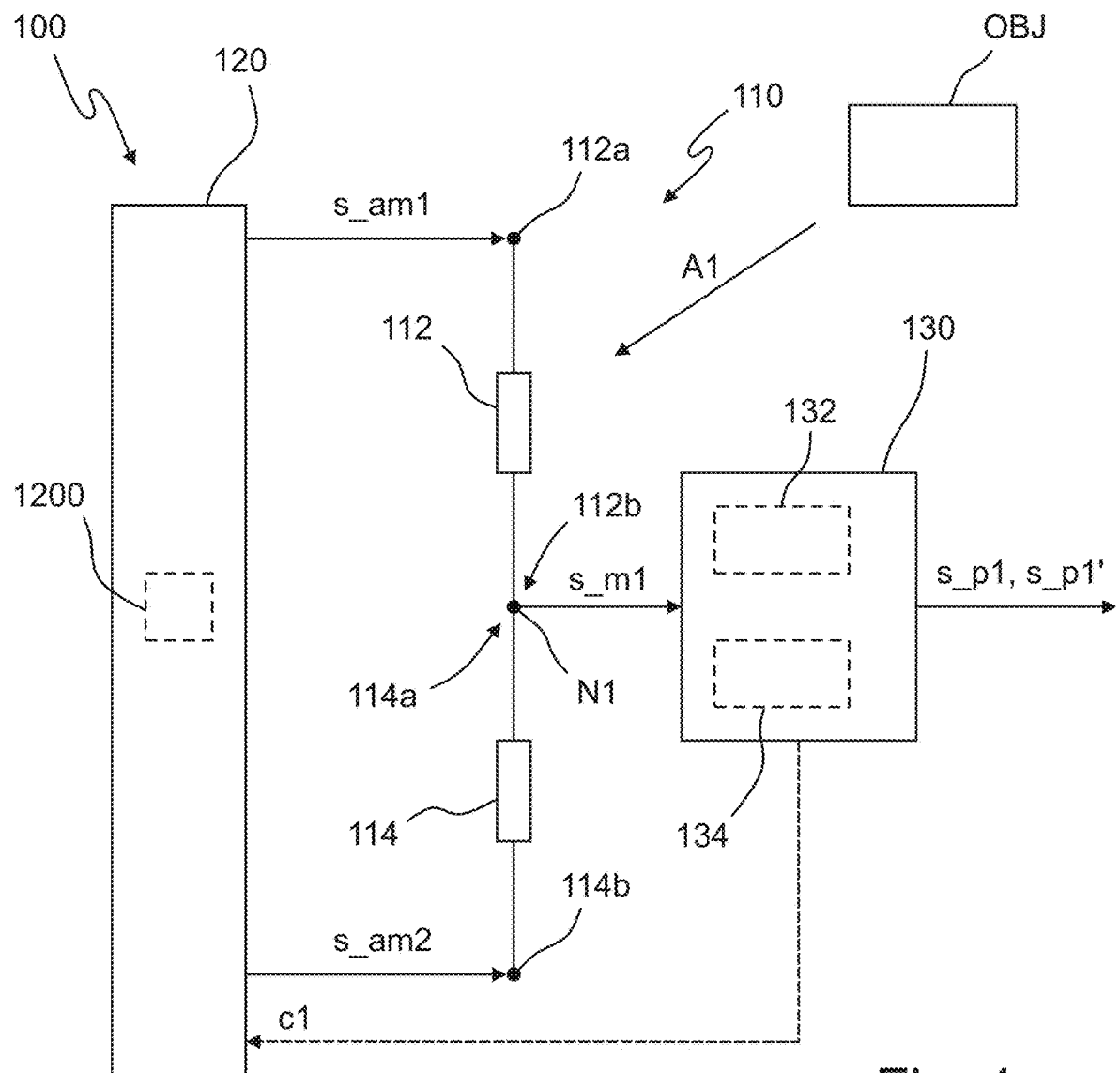
FIG. 1 schematically depicts a simplified block diagram of an apparatus according to an embodiment, FIG. 2 schematically depicts a simplified flow-chart of a method according to an embodiment, FIG. 3 schematically depicts aspects of a signal generator according to an embodiment, FIG. 4 schematically depicts aspects of a signal generator according to a further embodiment, FIG. 5 schematically depicts a simplified block diagram of a signal generator according to a further embodiment, FIG. 6 schematically depicts a simplified block diagram of an evaluation device according to a further embodiment, FIG. 7 schematically depicts amplitude modulated signals according to an embodiment, FIG. 8 schematically depicts a detail view of FIG. 7, FIGS. 9A, 9B, 9C each schematically depict a measurement signal according to an embodiment, FIGS. 10A, 10B, 10C each schematically depict a processed measurement signal derived from the respective measurement signal of FIG. 9A, 9B, 9C according to further embodiments, FIG. 11A schematically depicts frequency ranges according to further embodiments, FIGS. 11B, and 11C each schematically depict a spectral plot of a signal according to further embodiments, FIG. 12 schematically depicts a simplified block diagram of an apparatus according to a further embodiment, FIG. 13 schematically depicts a simplified block diagram of a signal generator according to a further embodiment, FIG. 14 schematically depicts a simplified block diagram of an apparatus according to a further embodiment, FIGS. 15A, and 15B each schematically depict measurement signals according to further embodiments, FIG. 16 schematically depicts frequency ranges according to further embodiments, FIG. 17 schematically depicts a state diagram according to further embodiments, FIG. 18 schematically depicts frequency ranges according to further embodiments, and FIG. 19 schematically depicts a simplified block diagram of an apparatus according to further embodiments.

FIG. 1 schematically depicts a simplified block diagram of an apparatus 100 according to an embodiment. The apparatus 100 comprises a series connection 110 of at least a first impedance 112 and a second impedance 114, wherein the first impedance 112 has a first terminal 112a and a second terminal 112b, wherein an impedance value of at least the first impedance 112 depends on a physical parameter to be measured, wherein the second impedance 114 has a first terminal 114a and a second terminal 114b, and wherein the second terminal 112b of the first impedance 112 is connected to the first terminal 114a of the second impedance 114 forming a first node N1. In other words, the connection of the terminals 112b, 114a defines the first node N1. According to some embodiments, the first impedance 112 may also be denoted as "measurement sensor" (as its impedance value depends on the physical parameter). According to further embodiments, the second impedance 114 may also be denoted as "reference "sensor"" (as its impedance value does preferably not depend on the physical parameter (or at least does it not depend on the physical parameter in the same way as the impedance value of the first impedance 112 does).

The apparatus 100 further comprises a signal generator 120 configured to apply a first amplitude modulated signal s_am1 to the first terminal 112a of the first impedance 112 and a second amplitude modulated signal s_am2 to the second terminal 114b of the second impedance 114. According to particularly preferred embodiments, the first amplitude modulated signal s_am1 and the second amplitude modulated signal s_am2 comprise the same carrier frequency, which reduces complexity as—according to further embodiments—e.g. a single signal source may be used for providing a carrier signal having the carrier frequency. Also, this way, a null signal (in a tuned state) may be attained at the first node N1, as further explained below.

Further, the apparatus 100 comprises an evaluation device 130 configured to receive a first measurement signal s_m1 from the first node N1 and to determine information on the at least one physical parameter depending on the first measurement signal s_m1.

According to further preferred embodiments, the evaluation device 130 comprises an envelope demodulator 132 and/or a bandpass filter 134 and/or a high-pass filter (not shown in FIG. 1) for processing the first measurement signal s_m1, whereby a first processed signal s_p1, s_p1' is obtained.

Optionally, the evaluation device 130 may be configured to provide at least one control signal c1 for influencing an operation of the signal generator 120 or at least one component of the signal generator 120. As an example, the control signal c1 may be used to control at least one signal property (e.g., amplitude and/or carrier frequency and/or modulation scheme) of at least one of the first amplitude modulated signal s_am1 and the second amplitude modulated signal s_am2.

According to further preferred embodiments, the first impedance 112 and the second impedance 114 may comprise at least one inductive element each, for example a coil. According to further preferred embodiments, the first impedance 112 and the second impedance 114 may also comprise at least one capacitive or resistive element each, or any other type of electrical element an impedance value of which may depend on a physical parameter, e.g. of an object OBJ to be measured, or any combination of various elements. As an example, if the first impedance 112 and the second impedance 114 comprise at least one inductive element (e.g., a coil) each, the presence or absence of an electrically conductive element (e.g., a solid electrically conductive element or an electrically conductive layer covering a surface of a non-conductive body or substrate), cf. the object OBJ, at a position close to at least the first impedance 112 may be detected. Also, by evaluating the first measurement signal s_m1, more detailed information may be determined, such as e.g. a thickness of an electrically conductive layer present on an object OBJ which is close to the first impedance 112, cf. arrow A1.

Figure 2:
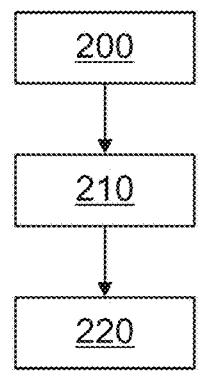

FIG. 2 schematically depicts a simplified flow-chart of a method according to an embodiment, the method comprising the following steps: applying 200, by means of the signal generator 120 (FIG. 1), a first amplitude modulated signal s_am1 to the first terminal 112a of the first impedance 112 and a second amplitude modulated signal s_am2 to the second terminal 114b of the second impedance 114, receiving 210 (FIG. 2), by the evaluation device 130, the first measurement signal s_m1 (FIG. 1) from the first node N1, and determining 220 (FIG. 2) information on the at least one physical parameter depending on the first measurement signal s_m1.

According to further preferred embodiments, the steps of applying 200, receiving 210, and determining 220 may be repeated for a predetermined number of times or measurements and/or for a predetermined amount of time, wherein for each of the predetermined number of times or measurements a same or a different carrier frequency may be used. According to particularly preferred embodiments, the principle according to the embodiments may be employed for a predetermined number or range of carrier frequencies, whereby detailed information on the physical parameter of the object OBJ may be obtained. Exemplary embodiments illustrating measurements with different carrier frequencies are provided further below.

Figure 3:
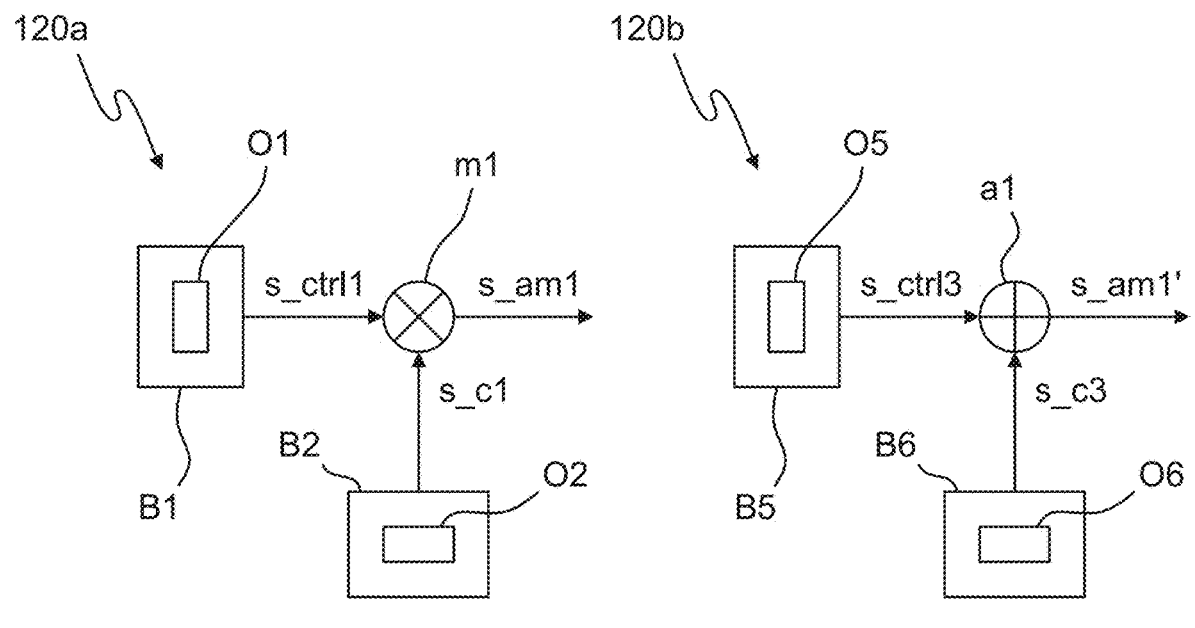
Figure 4:
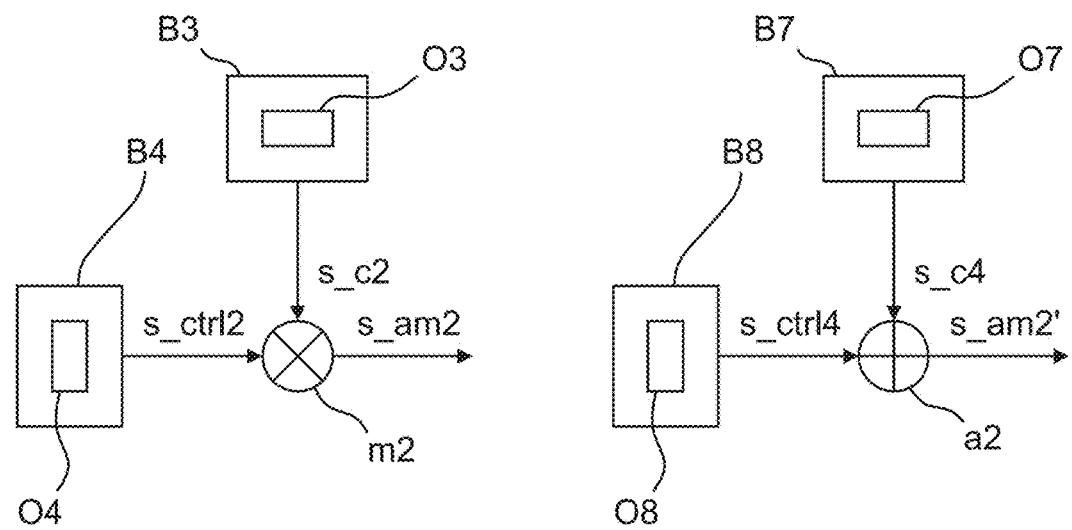

FIGS. 3, 4 schematically depict aspects of signal generators 120a, 120b according to further embodiments. As an example, signal generator 120 of FIG. 1 may comprise a configuration identical or at least similar to the configuration of FIG. 3 and/or the configuration of FIG. 4.

The signal generator 120a of FIG. 3 is configured to provide the first amplitude modulated signal s_am1 by multiplying via a multiplier m1 a first carrier signal s_c1 having a carrier frequency with a periodic first control signal s_ctr11. According to further embodiments, the first control signal s_ctr11 is provided by a block B1, which may e.g. comprise a first oscillator O1 that provides a sinusoidal output signal representing the first control signal s_ctr11. According to further embodiments, the first carrier signal s_c1 is provided by a block B2, which may e.g. comprise a second oscillator O2 that provides a sinusoidal output signal representing the first carrier signal s_c1.

Similarly, the signal generator 120a of FIG. 3 is further configured to provide the second amplitude modulated signal s_am2 by multiplying, via a multiplier m2, a second carrier signal s_c2 having the (same) carrier frequency as the first carrier signal s_c1 with a periodic second control signal s_ctr12. According to further embodiments, the second carrier signal s_c2 is provided by a block B3, which may e.g. comprise a third oscillator O3 that provides a sinusoidal output signal representing the second carrier signal s_c2. According to further embodiments, the second control signal s_ctr12 is provided by a block B4, which may e.g. comprise a fourth oscillator O4 that provides a sinusoidal output signal representing the second control signal s_ctr12.

According to further embodiments, the block B1 may be configured to generate a periodic non-sinusoidal signal such as e.g. a square wave signal (rectangular signal) and to derive a sinusoidal signal from the periodic non-sinusoidal signal, which sinusoidal signal may form the first control signal s_ctr11. According to further embodiments, this may also apply to any or a plurality of the blocks B2, B3, B4.

According to further embodiments, the block B1 may also be configured to receive a periodic non-sinusoidal signal such as e.g. a square wave signal (rectangular signal) from another component, e.g. from the evaluation device 130 (FIG. 1), cf. reference sign c1, and to derive the first control signal s_ctr11 from the received periodic non-sinusoidal signal. According to further embodiments, this may also apply to any or a plurality of the blocks B2, B3, B4.

According to further embodiments, the second carrier signal s_c2 has a predetermined first phase shift with respect to the first carrier signal s_c1, wherein preferably the second control signal s_ctr12 has a predetermined second phase shift with respect to the first control signal s_ctr11. This enables a particularly efficient evaluation of the first measurement signal s_m1, as explained further below, e.g. with reference to FIG. 12.

According to further preferred embodiments, the first phase shift and/or the second phase shift is 90 degrees or a multiple of 90 degrees. This way, according to further embodiments, in the absence of an object OBJ (FIG. 1) to be measured, a null signal may be obtained at the first node N1, the null signal comprising a sinusoidal signal shape with a frequency of the carrier signals, e.g. without modulation components, which, according to further embodiments, may be demodulated using e.g. an envelope demodulation, which leads to a further null signal, i.e. without carrier signal or carrier frequency components.

As an example, if an object OBJ comprising diamagnetic material is moved into the proximity of the first impedance 112, cf. arrow A1 of FIG. 1, the aforementioned null signal at the first node N1 is detuned, e.g. it changes to a non-vanishing amplitude-modulated signal, corresponding to the frequency of the control signals and the properties of the object OBJ. This effect also concerns the (envelope-) demodulated signal using the optional envelope demodulator, so that the information related to the object OBJ is also comprised in the (envelope-)demodulated signal, where it can efficiently be evaluated. In other words, e.g. a detuning of the null signal at the first node N1, for example regarding its amplitude (based on the fact that an impedance value of the first impedance depends on the physical parameter to be measured), may also be observed in the form of a correspondingly detuned (envelope-)demodulated signal (which is e.g. also detuned regarding its amplitude, but not regarding its phase).

As a further example, if an object OBJ comprising ferrous material is moved into the proximity of the first impedance 112, the aforementioned null signal at the first node N1 is also detuned, however primarily regarding its phase, e.g. it changes to a non-vanishing amplitude-modulated signal, corresponding to the frequency of the control signals and the properties of the object OBJ. This effect also concerns the (envelope-) demodulated signal using the optional envelope demodulator, so that the information related to the object OBJ is also comprised in the (envelope-) demodulated signal, where it can efficiently be evaluated. In other words, e.g. a detuning of the null signal at the first node N1, for example regarding its phase (based on the fact that an impedance value of the first impedance depends on the physical parameter to be measured), may also be observed in the form of a correspondingly detuned (envelope-) demodulated signal (which is e.g. also detuned regarding its phase).

To summarize, according to preferred embodiments, a detuning of the series connection 110 may generally lead to a detuned state that is characterized by a nonvanishing amplitude modulated signal or sum signal in the form of the first measurement signal s_m1 at the first node N1, instead of a null signal e.g. merely comprising carrier frequency components. In the detuned state, an amplitude and/or phase of the first measurement signal s_m1 at the first node N1 comprises information related to the object OBJ to be measured, which information may be transformed into the demodulated or processed signal s_p1, s_p1' for (further) evaluation.

According to further preferred embodiments, no specific phase and/or amplitude relation between any of the carrier signals s_c1, s_c2 and any of the control signals s_ctr11, s_ctr12 is required. In other words, according to further preferred embodiments, an amplitude and/or phase of the control signals s_ctr11, s_ctr12 may be chosen independently of an amplitude and/or phase of the carrier signals s_c1, s_c2.

Turning to FIG. 4, the signal generator 120b is configured to provide a first amplitude modulated signal s_am1' by adding, via an adder a1, a third carrier signal s_c3 with a periodic third control signal s_ctr13. According to further embodiments, the third control signal s_ctr13 is provided by a block B5, which may e.g. comprise a fifth oscillator O5 that provides a sinusoidal output signal representing the third control signal s_ctr13. According to further embodiments, the third carrier signal s_c3 is provided by a block B6, which may e.g. comprise a sixth oscillator O6 that provides a sinusoidal output signal representing the third carrier signal s_c3.

Similarly, the signal generator 120b of FIG. 4 is further configured to provide a second amplitude modulated signal s_am2' by adding, via an adder a2, a fourth carrier signal s_c4 having the carrier frequency with a periodic fourth control signal s_ctr14. According to further embodiments, the fourth carrier signal s_c4 is provided by a block B7, which may e.g. comprise a seventh oscillator O7 that provides a sinusoidal output signal representing the fourth carrier signal s_c4. According to further embodiments, the fourth control signal s_ctr14 is provided by a block B8, which may e.g. comprise an eighth oscillator O8 that provides a sinusoidal output signal representing the fourth control signal s_ctr14.

Preferably, the fourth carrier signal s_c4 has a predetermined third phase shift with respect to the third carrier signal s_c3, wherein preferably the fourth control signal s_ctr14 has a predetermined fourth phase shift with respect to the third control signal s_ctr13. According to further preferred embodiments, the third phase shift is 180 degrees, wherein preferably the fourth phase shift is zero. This way, according to further embodiments, as far as the control signals s_ctr13, s_ctr14 are concerned, the series connection 110 or its impedances 112, 114 are provided with a common mode signal leading to a vanishing voltage difference (as far as the control signals s_ctr13, s_ctr14 are concerned) and correspondingly vanishing current through the impedances 112, 114, and thus, in the case of inductive elements 112, 114, no generation of a magnetic field (based on the control signals). It is emphasized that this applies to the signal components of the first measurement signal s_m1 based on the common mode control signals s_ctr13, s_ctr14. By contrast, according to further preferred embodiments, the carrier signals are preferably provided in a push-pull-mode of operation, e.g. with the third phase shift being 180 degrees, thus effecting a magnetic field (based on the carrier signals) and enabling measurements related to the object OBJ.

According to further preferred embodiments, no specific phase and/or amplitude relation between any of the carrier signals s_c3, s_c4 and any of the control signals s_ctr13, s_ctr14 is required. In other words, according to further preferred embodiments, an amplitude and/or phase of the control signals s_ctr13, s_ctr14 may be chosen independently of an amplitude and/or phase of the carrier signals s_c3, s_c4.

According to further preferred embodiments, the signal generator 120 of FIG. 1 is configured to at least temporarily provide amplitude modulated signals s_am1, s_am2 according to the configuration 120a explained above with reference to FIG. 3, and to at least temporarily provide amplitude modulated signals s_am1', s_am2' according to the configuration 120b explained above with reference to FIG. 4.

Figure 5:
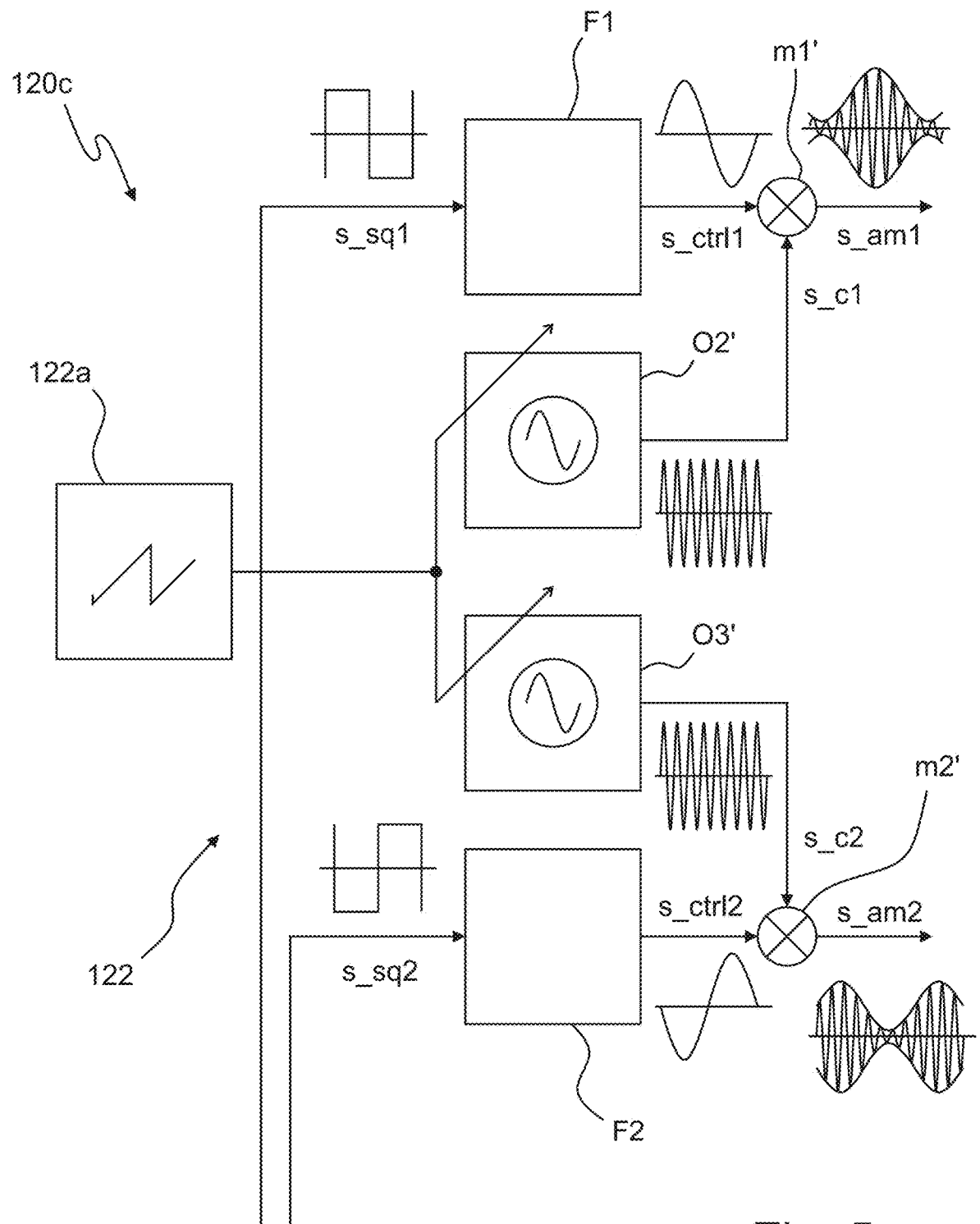

FIG. 5 schematically depicts a simplified block diagram of a signal generator 120c according to a further embodiment. Similar to the signal generator 120a explained above with reference to FIG. 3, the signal generator 120c of FIG. 5 provides amplitude modulated signals s_am1, s_am2 which are obtained by multiplying respective carrier signals s_c1, sc2 with respective control signals s_ctr11, s_ctr12 each by means of the multipliers m1', m2'. According to the present embodiment, the first control signal s_ctr11, which is preferably a sinusoidal signal, is derived from a first square wave signal s_sq1 by means of a first filter F1, preferably a bandpass filter, and the second control signal s_ctr12, which is preferably also a sinusoidal signal, is derived from a second square wave signal s_sq2 by means of a second filter F2, preferably also a bandpass filter.

According to further preferred embodiments, the square wave signals s_sq1, s_sq2 comprise a relative phase shift of 180 degrees, and the filters F1, F2 are configured such that they have the same frequency characteristic and that they preserve the relative phase shift of 180° of the square wave signals s_sq1, s_sq2. In other words, the sinusoidal control signals s_ctr11, s_ctr12 obtained by the filters F1, F2 comprise the same frequency and the desired phase shift of presently 180 degrees.

According to further preferred embodiments, the carrier signals s_c1, s_c2 may be provided by a sweep generator arrangement 122 comprising controllable oscillators O2', O3' that provide a preferably sinusoidal output signal each in form of the carrier signals s_c1, s_c2 under control of a sawtooth generator 122a. Similar to the configuration 120a of FIG. 3, the carrier signals s_c1, s_c2 of the oscillators O2', O3' according to FIG. 5 have a predetermined relative first phase shift, the first phase shift preferably being 90 degrees or a multiple of 90 degrees.

According to further preferred embodiments, the square wave signals s_sq1, s_sq2 may be provided by the evaluation device 130, cf. FIG. 1, also cf. reference numeral c1 of FIG. 1.

Figure 6:
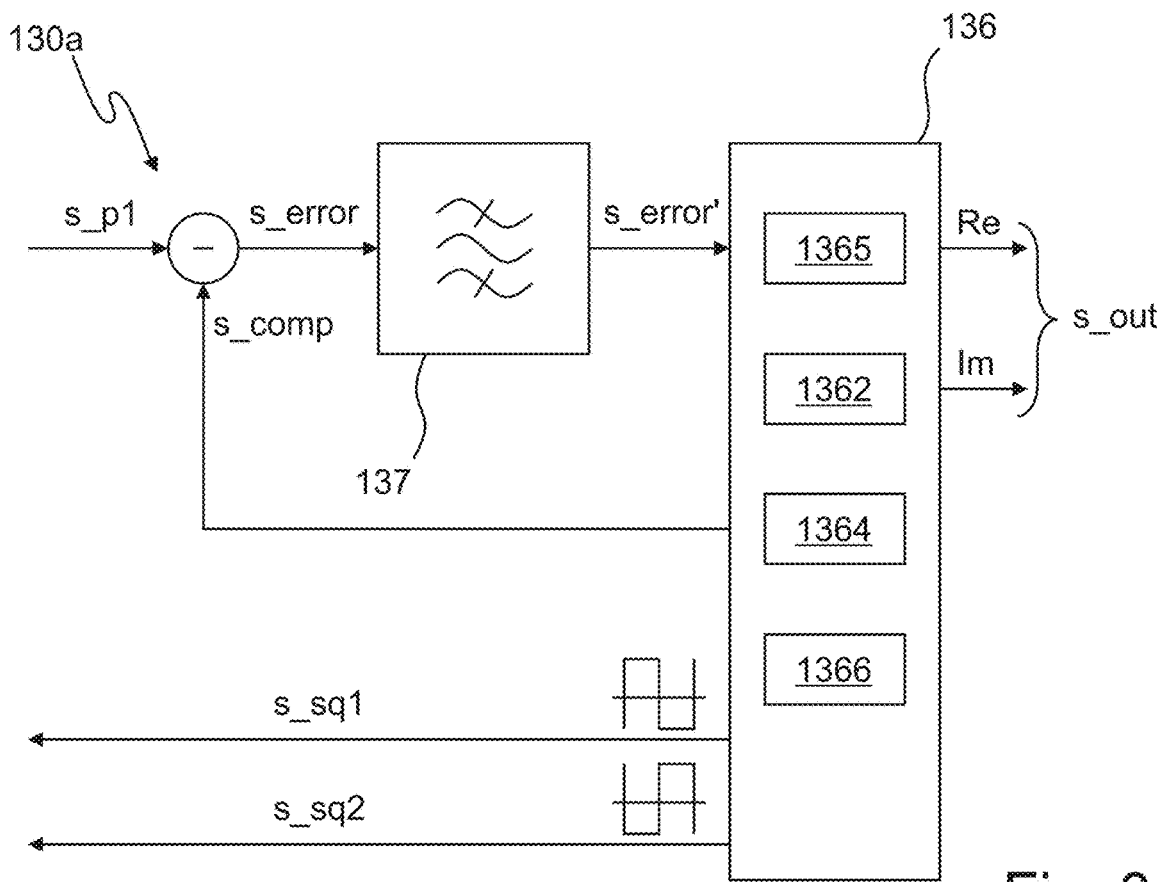

FIG. 6 schematically depicts a simplified block diagram of an evaluation device 130a according to a further embodiment. The evaluation device 130a comprises a control circuit 136 for providing a compensation signal s_comp, wherein the compensation signal s_comp is determined such that a sum of the first processed signal s_p1 and the compensation signal s_comp, also termed as error signal s_error, is zero. According to further preferred embodiments, the control circuit 136 may comprise a closed-loop control which is configured to receive the error signal s_error and which may be configured to influence the compensation signal s_comp to minimize the error signal s_error. According to further preferred embodiments, the control circuit 136 may output an output signal s_out, which is preferably a complex signal that may e.g. be represented by a real part Re and an imaginary part Im. Advantageously, the output signal s_out may correspond with the compensation signal s_comp or may be derived from the compensation signal s_comp. This way, the output signal s_out comprises information on an amplitude and/or phase of the compensation signal s_comp required for minimizing the error signal s_error, and thus information on a detuned state of the series connection 110 (FIG. 1), which characterizes the physical parameter of the object OBJ to be measured.

As can be seen from FIG. 6, optionally, the evaluation device 130a may comprise a combined filter and amplifier unit 137 for filtering and/or amplifying the error signal s_error, to obtain a processed error signal s_error'.

According to further embodiments, the output signal s_out can be used to derive information on the physical parameter to be measured by the apparatus 100 according to the embodiments. Preferably, for a further evaluation, the output signal s_out is considered in combination with a frequency of the carrier signals s_c1, s_c2 (or s_c3, s_c4).

According to further preferred embodiments, the control circuit 136 may also be configured to provide the square wave signals s_sq1, s_sq2 for the signal generator 120c as explained above with reference to FIG. 5.

According to further preferred embodiments, the control circuit 136 may comprise a calculating unit 1362, a memory unit 1364 that comprises volatile memory and/or non-volatile memory, for example a random-access memory (RAM) and a Flash-EEPROM. The calculating unit 1362 may be configured to control an operation of the control circuit 136 such as providing the compensation signal s_comp and/or the square wave signals s_sq1, s_sq2 for the signal generator 120*c*, and/or the output signal s_out. According to further preferred embodiments, the control circuit 136 comprises an analog-to-digital converter (ADC) 1365, e.g. for transforming the error signal s_error or the processed error signal s_error', respectively, from the analog domain to the digital domain. For this, an arbitrary precision or resolution may be used, e.g. depending on an intended field of application. According to some embodiments, a resolution of 8 bit may be used. However, according to further embodiments, a resolution of e.g. 12 bit or 18 bit may be used (higher resolution such as e.g. 24 bit or more is also possible according to further embodiments). According to further preferred embodiments, the control circuit 136 further comprises a digital-to-analog (DAC) converter 1366, e.g. for providing the analog compensation signal s_comp. The abovementioned comments regarding precision also apply to the DAC 1366. According to further embodiments, at least one of the devices 1362, 1364, 1365, 1366 may be implemented in form of a microcontroller and/or a microprocessor and/or a digital signal processor (DSP) and/or a programmable logic device such as a field programmable gate array (FPGA) and/or an application specific integrated circuit.

Similarly, according to further embodiments, at least some components of any of the signal generators 120, 120*a*, 120*b*, 120*c* and/or a source of the square wave signals s_sq1, s_sq2 may be implemented by using hardware and/or software and/or any combination thereof. As an example, in some embodiments, the signal generators 120, 120*a*, 120*b*, 120*c* may be, preferably completely, implemented using hardware. According to further embodiments, the signal generators 120, 120*a*, 120*b*, 120*c* may be at least partly implemented in form of software, e.g. in form of a computer program, which for example is executed by the calculating unit 1362.

According to further particularly preferred embodiments, the signal generators 120, 120*a*, 120*b*, 120*c* are implemented by using dedicated hardware for direct digital synthesis (DDS) of the various signals s_am1, s_am2, s_am1', s_am2' and/or any signals the signals s_am1, s_am2, s_am1', s_am2' are derived from.

Optionally, according to further embodiments, any of the signals s_am1, s_am2, s_am1', s_am2' may be amplified prior to providing it—or its amplified version, respectively, to the terminals 112*a* and/or 114*b* (FIG. 1) of the series connection 110. Evidently, this optional amplification may be applied to any of the signals s_am1, s_am2, s_am1', s_am2' independent of how they have been generated.

Figure 7:
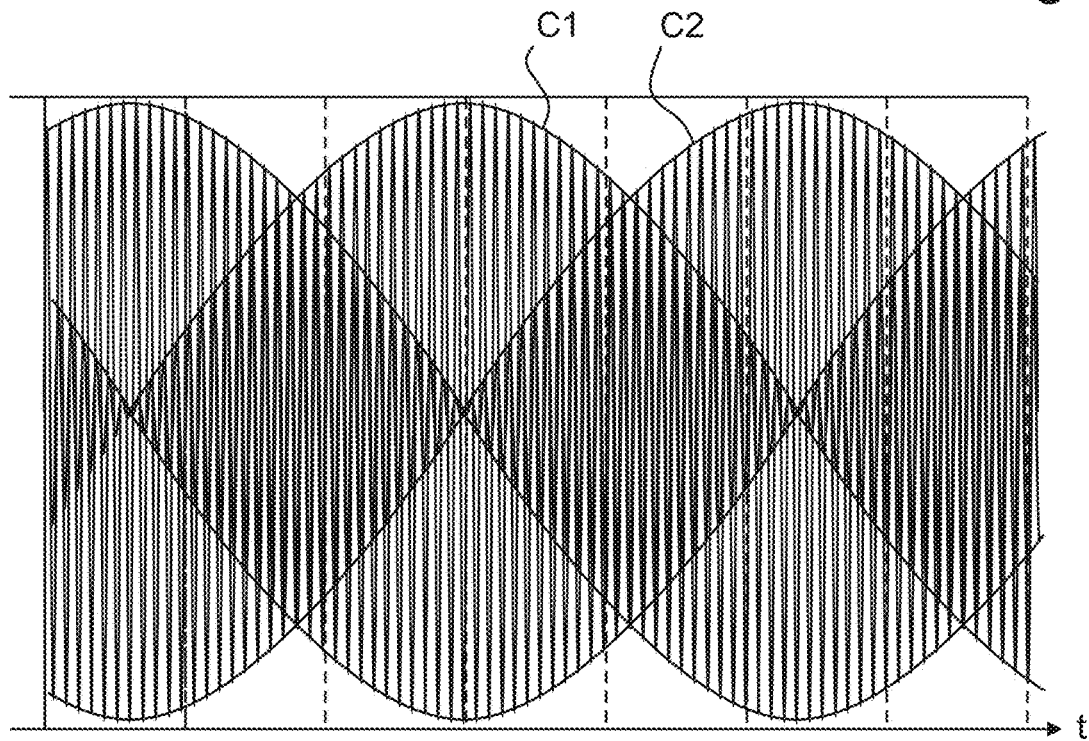
Figure 8:
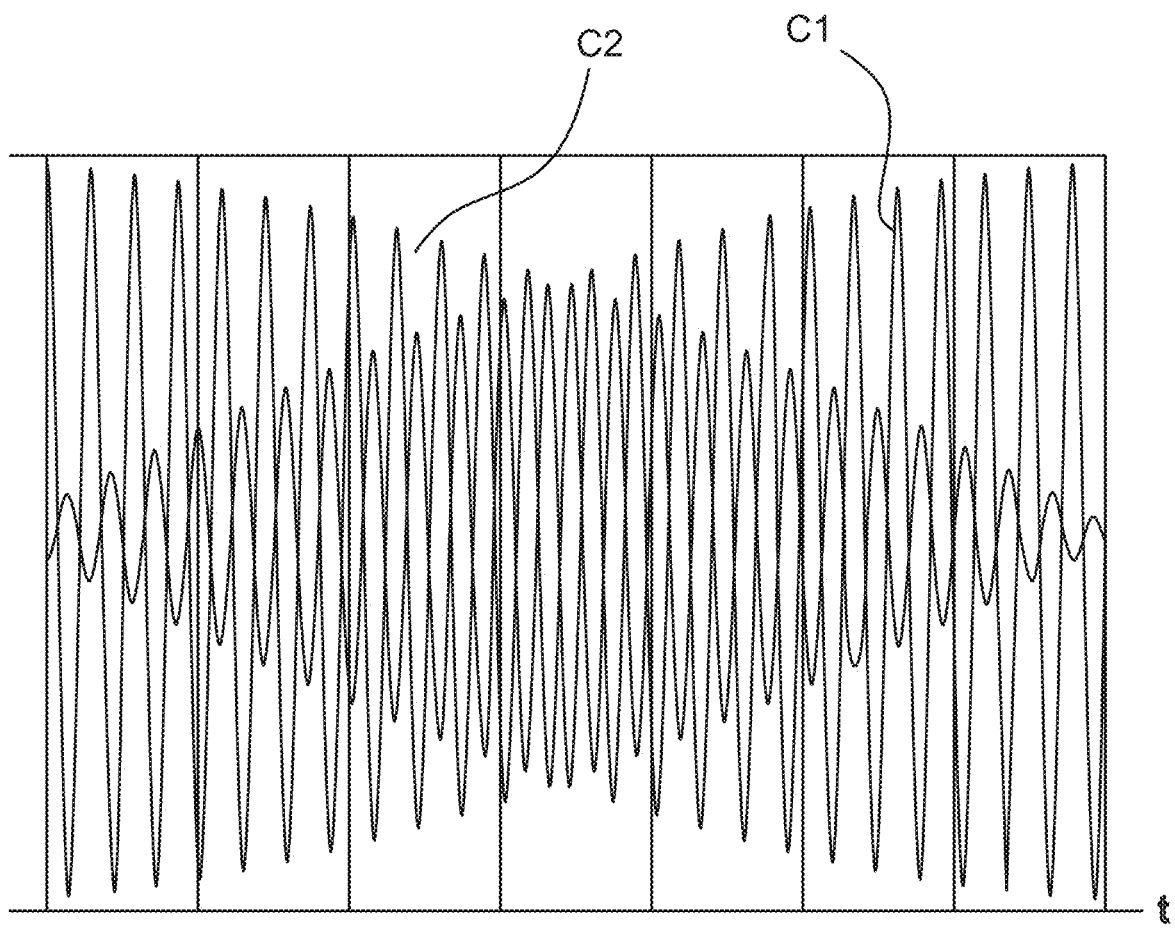

FIG. 7 schematically depicts a plot of amplitude modulated signals over time t according to an embodiment, and FIG. 8 schematically depicts a detail view of FIG. 7. Curve C1 corresponds with the first amplitude modulated signal s_am1, and curve C2 corresponds with the second amplitude modulated signal s_am2. The signals s_am1, s_am2 or the corresponding curves C1, C2 may e.g. be obtained by using the signal generator 120*a* of FIG. 3. As can be seen from FIG. 7, 8, a phase shift between the control signals ("information signals", corresponding to envelopes of the curves C1, C2), which are modulated onto the respective carrier signals s_c1, s_c2 (FIG. 3), is 90 degrees. In the detail view of FIG. 8, the phase shift between the carrier signals s_c1, s_c2 can be seen, which is presently also 90 degrees.

Figure 9A:
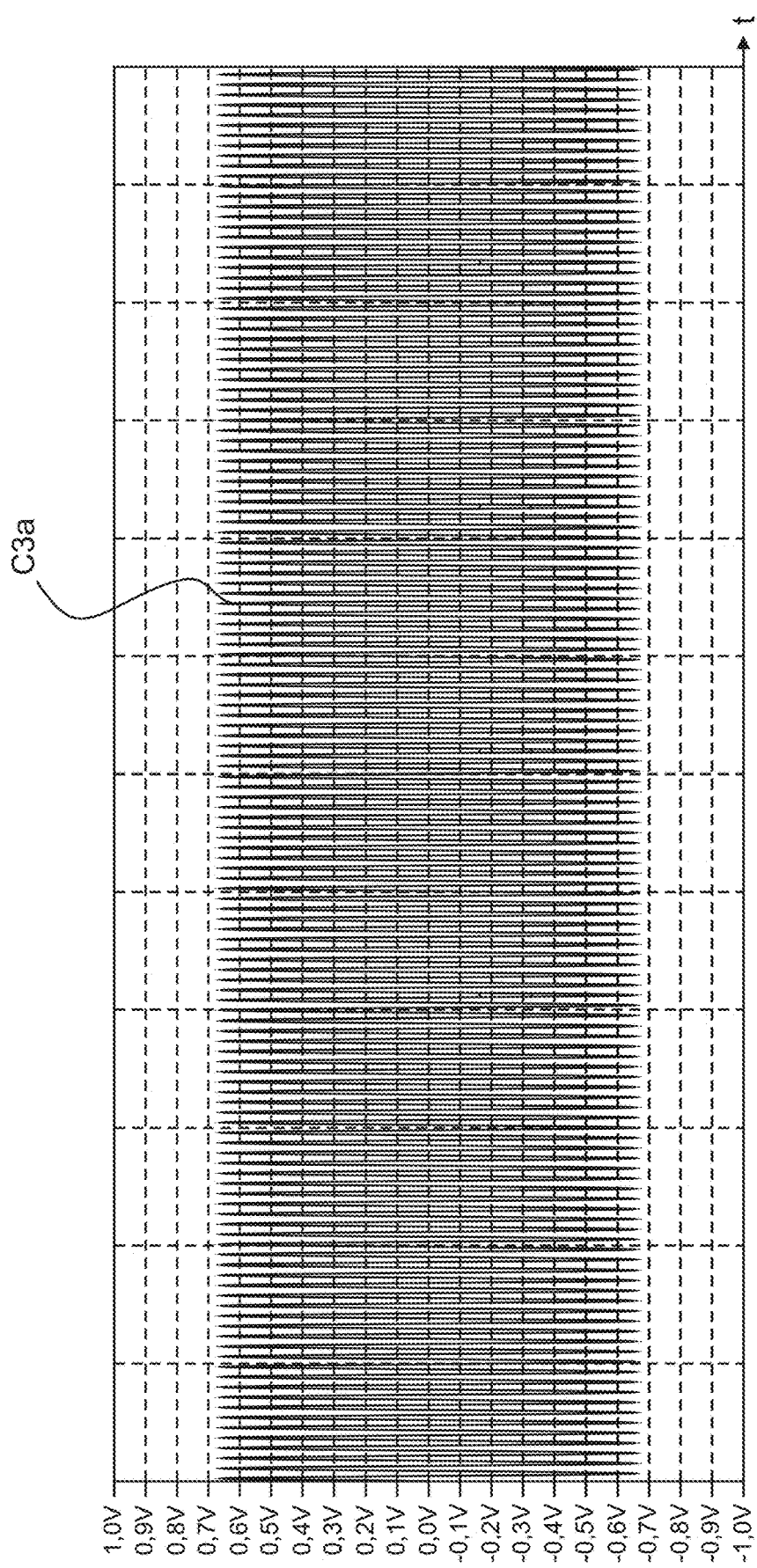
Figure 10A:
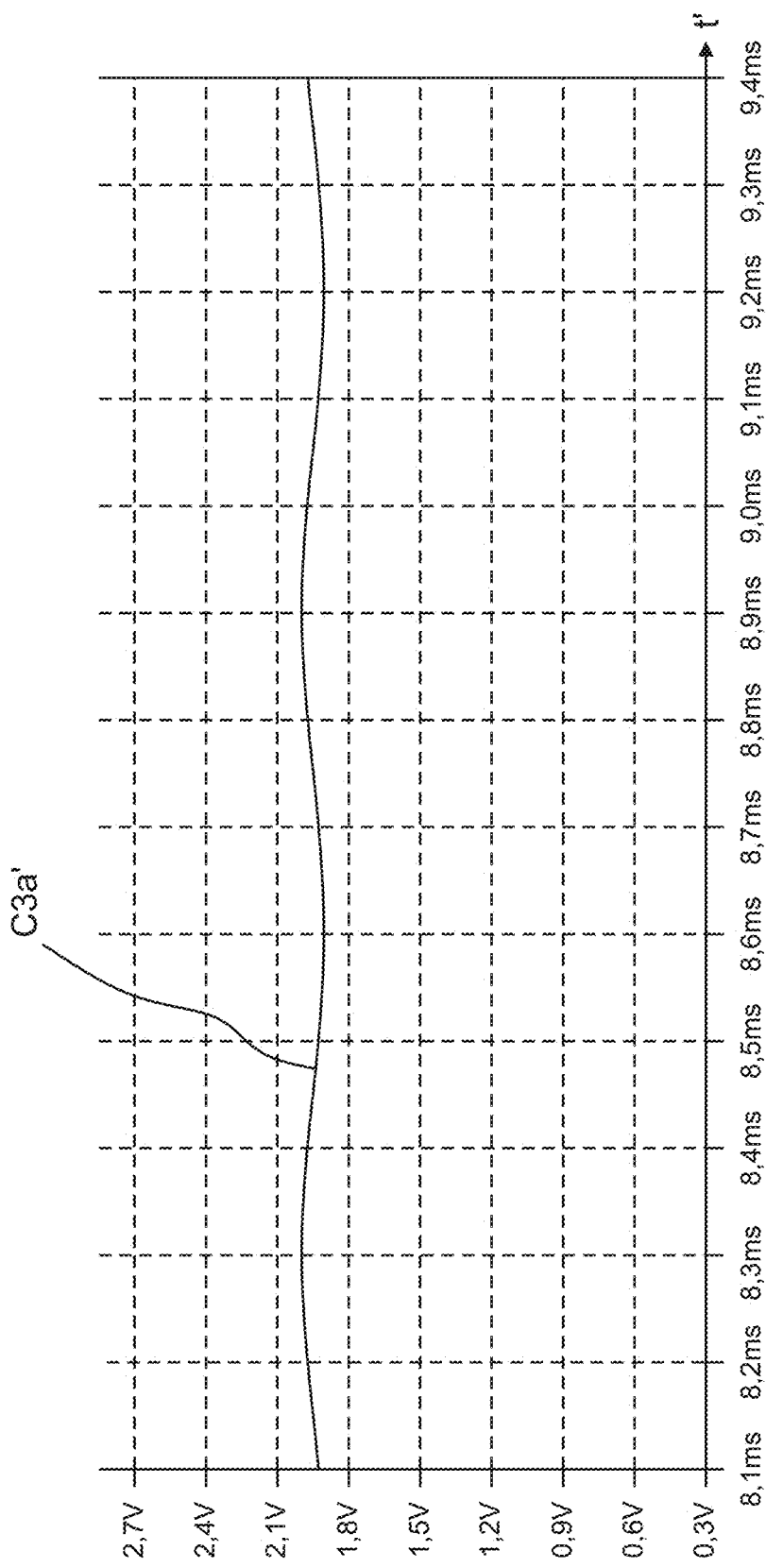

When supplying the amplitude modulated signals s_am1, s_am2 with the abovementioned phase shifts to the respective terminals 112*a*, 114*b* of the series connection 110 of FIG. 1, and especially in the absence of the object OBJ to be measured, a substantially vanishing sum signal (regarding a signal envelope) is obtained as the measurement signal s_m1 at the first node N1. Curve C3*a* of FIG. 9A schematically depicts this scenario. Curve C3*a*' of FIG. 10A schematically depicts a processed measurement signal s_p1 (FIG. 1) derived from the respective measurement signal s_m1 of FIG. 9A (curve C3*a*), e.g. by envelope demodulation via the envelope demodulator 132 (FIG. 1). It can be seen that curve C3*a*' is basically constant over the time axis t'.

Figure 9B:
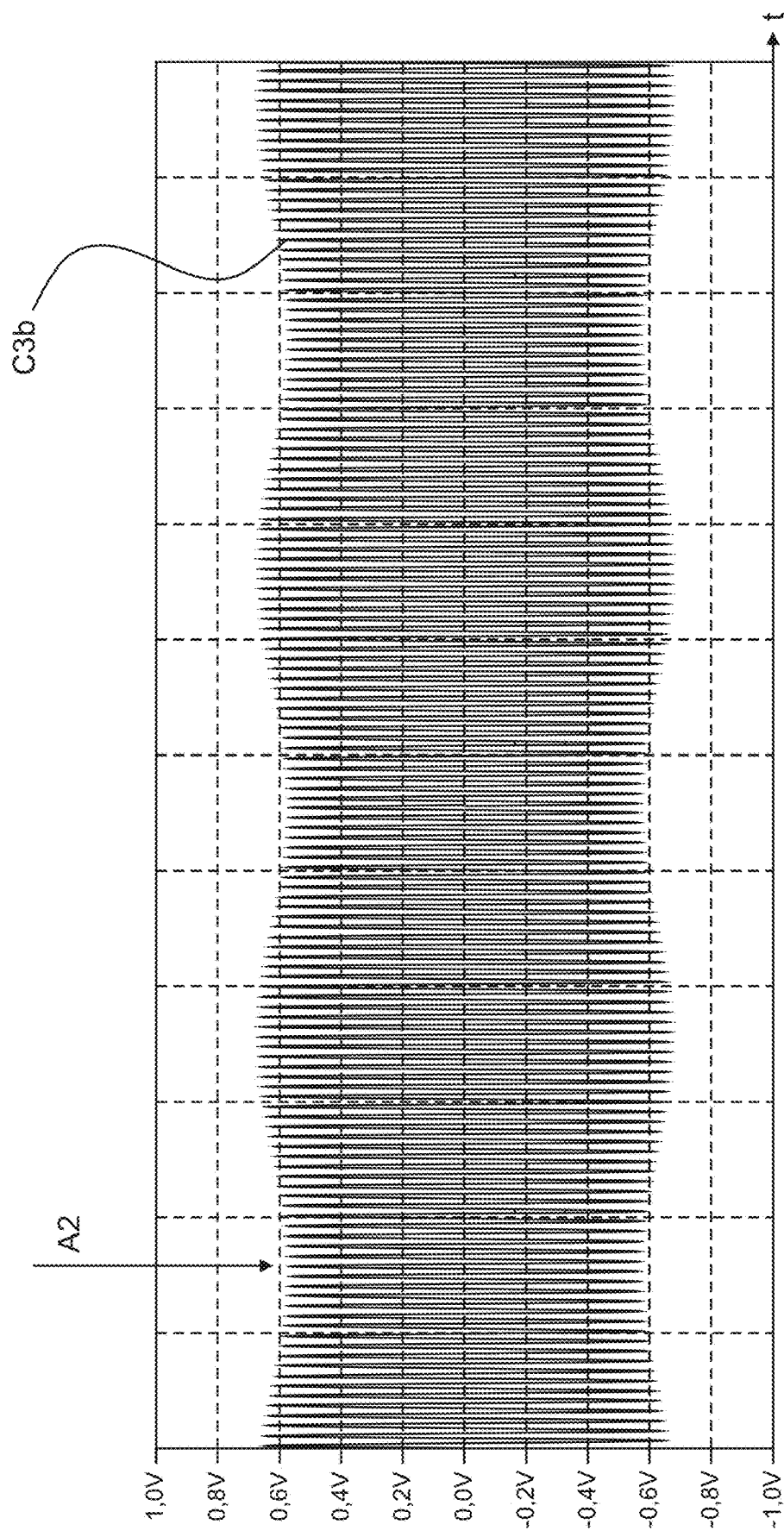
Figure 10B:
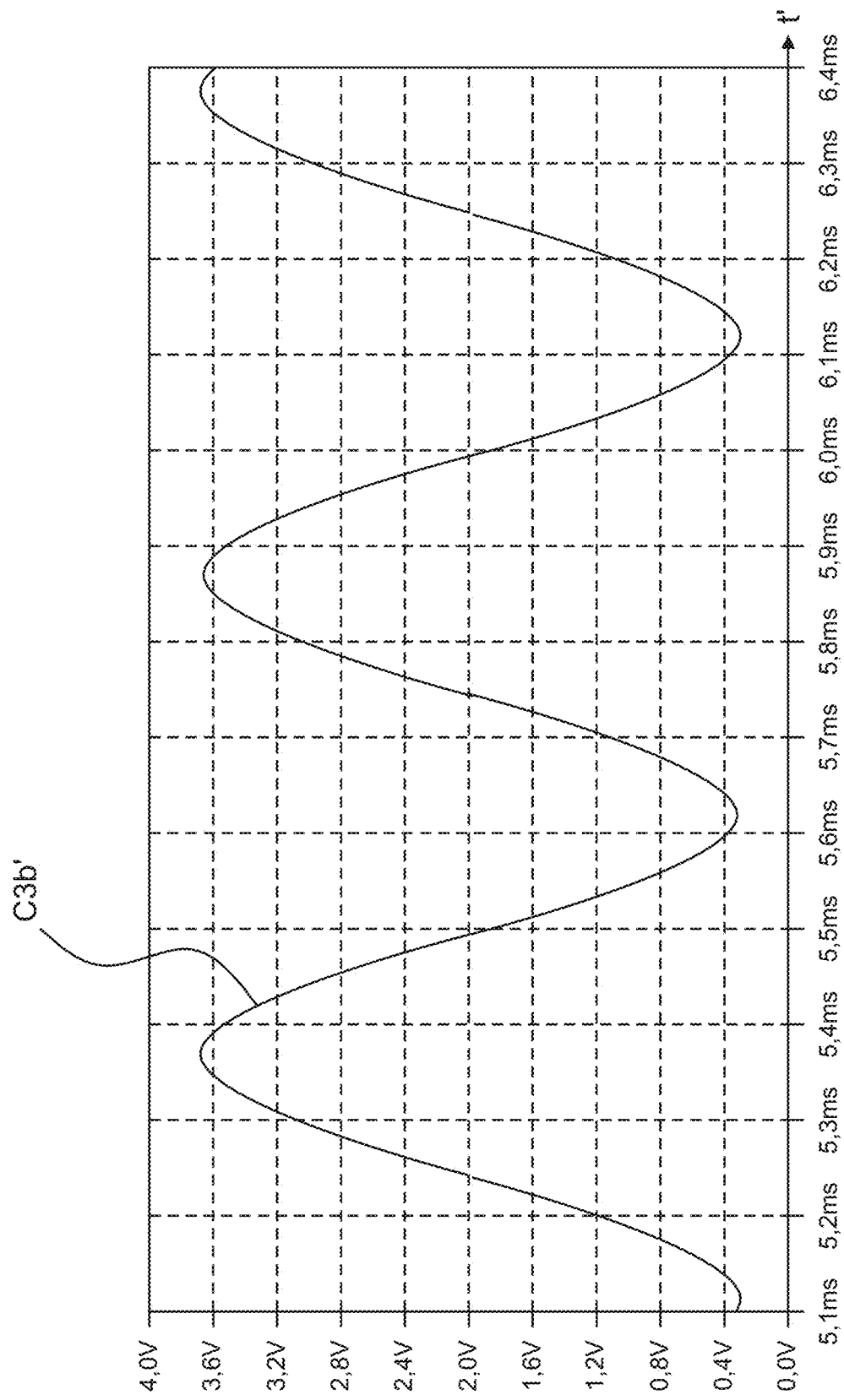

According to further preferred embodiments, if the object OBJ to be measured (FIG. 1) is present or is moved towards the first impedance 112 of the series connection 110 (cf. arrow A1 of FIG. 1), the measurement signal s_m1 is detuned, so that a nonvanishing sum signal (regarding a signal envelope) is obtained as the measurement signal s_m1 at the first node N1. Curve C3*b* of FIG. 9B schematically depicts this scenario, cf. e.g. the local minimum of the envelope of curve C3*b* indicated by the arrow A2. Curve C3*b*' of FIG. 10B schematically depicts a processed measurement signal s_p1 (FIG. 1) derived from the respective measurement signal s_m1 of FIG. 9B (curve C3*b*), e.g. by envelope demodulation via the envelope demodulator 132 (FIG. 1). It can be seen that curve C3*b*' is not constant over the time axis t', but rather comprises information on the object OBJ to be measured. As an example, a detuning of an amplitude of the measurement signal s_m1 may occur if the object OBJ comprises diamagnetic material such as e.g. copper, aluminum, brass, wherein the detuning results from eddy currents induced in the diamagnetic material, which account for an attenuation of the measurement signal s_m1. The amplitude detuning is characteristic for diamagnetic material as it is associated with a specific phase, which can be distinguished from a detuning of the measurement signal s_m1 due to e.g. proximity of an object OBJ comprising ferrous metal.

Figure 10C:
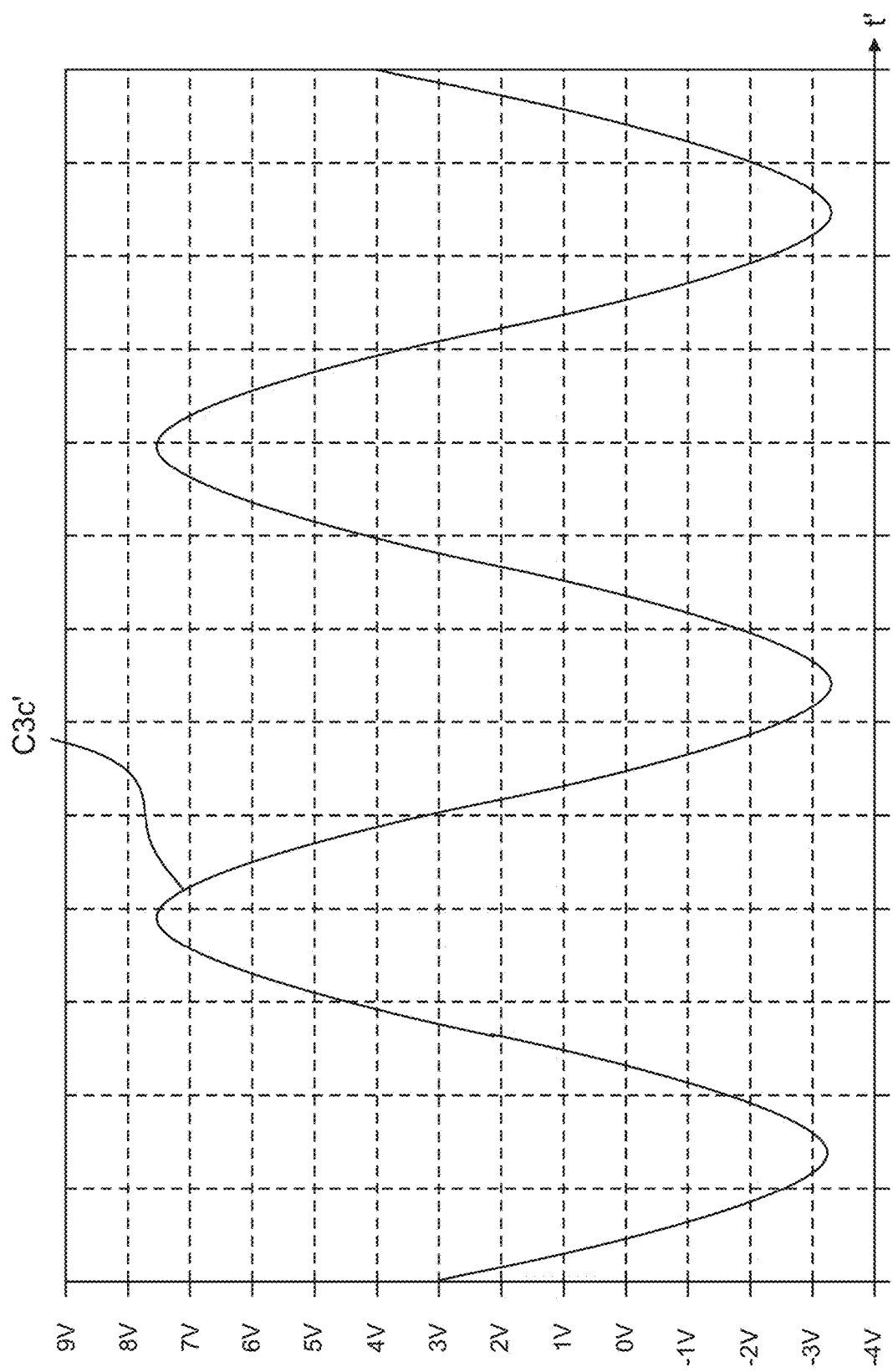

FIG. 9C schematically depicts a further scenario, wherein the measurement signal s_m1 is detuned by an object OBJ (FIG. 1) comprising ferrous metal, cf. curve C3*c* and arrow A3. Curve C3*c*' of FIG. 10C schematically depicts a processed measurement signal s_p1 (FIG. 1) derived from the respective measurement signal s_m1 of FIG. 9C (curve C3*c*), e.g. by envelope demodulation via the envelope demodulator 132 (FIG. 1).

According to further preferred embodiments, by evaluating the signal properties such as e.g. amplitude and/or phase of the processed measurement signal s_p1 (FIG. 1), information on the object OBJ to be measured may be determined. As already explained above, according to further preferred embodiments, a detuned processed measurement signal s_p1 may be compensated using the compensation signal s_comp, cf. FIG. 6, and the complex output signal s_out obtained thereby comprises the information related to phase shift and/or attenuation imparted on the measurement signal s_m1 by the object OBJ to be measured.

Advantageously, if a sweep generator arrangement 122 such as exemplarily depicted by FIG. 5 is used for generating the amplitude modulated signals s_am1, s_am2, the measurements and evaluation explained above with reference to FIG. 9A to 10C may be carried out for a plurality of carrier frequencies, corresponding to the frequency range covered by the sweep. This way, detailed information on the object OBJ to be measured may be obtained.

According to further preferred embodiments, the signal generator 120 (FIG. 1) is configured to selectively provide the first amplitude modulated signal s_am1 and the second amplitude modulated signal s_am2 with a predetermined carrier frequency, which enables measurements at the specific carrier frequency. While for both the first amplitude modulated signal and the second amplitude modulated signal preferably the (same) carrier frequency is used, particularly to obtain a vanishing sum signal in a "tuned state" (i.e., absence of the object OBJ), according to further preferred embodiments, the carrier frequency for both signals s_am1, s_am2 may be varied substantially arbitrarily, which enables to perform measurements at respective different frequencies, as mentioned above. This way, e.g. when using inductive elements as the first impedance 112 and the second impedance 114, measurements in different depths of the object OBJ to be measured may be made, as the skin depth is dependent on frequency.

Generally, the principle according to the embodiments enables to transfer information of the object OBJ to be measured from a frequency range associated with the carrier signals s_c1, s_c2 to a lower frequency range associated with the control signals s_ctr11, s_ctr12. This way, comparatively high carrier frequencies (e.g. in the GHz (gigahertz) range, for example around 2.4 GHz) may be used, and the amplitude and/or phase variations (or the corresponding information, respectively) obtained by using these carrier signals may be transferred without loss to lower frequencies, for example in the range of the frequency of the control signals, e.g. for efficient evaluation with common ADCs. Especially, according to further preferred embodiments, the phase and/or amplitude variations as obtained at the carrier frequency are scaled proportionally to the lower frequency range associated with the control signals, so that they can precisely be evaluated in the lower frequency range using less costly hardware and/or offering higher precision as compared to a direct evaluation of signals e.g. in the frequency range of the carrier signals (e.g., around 2.4 GHz).

As an example, according to some embodiments, the frequency of the carrier signals may e.g. range around 2.4 GHz, whereas the frequency of the control signals ranges around 10 kHz. According to Applicant's analysis, for such configurations, advantageously, a resolution or precision regarding the evaluation of the processed signal s_p1, s_p1' of about 18 bit may be attained. According to further embodiments, when using control signals in the 1 kHz range, the resolution or precision regarding the evaluation of the processed signal s_p1, s_p1' may even be increased to about 28 bit. This way, many new fields of application are enabled by applying the principle according to the embodiments.

According to further embodiments, no correlation (neither in amplitude, nor in phase) between the control signals and the carrier signals is required, which offers further degrees of freedom for the operation of the apparatus 100 according to the embodiments. Thus, according to further preferred embodiments, e.g. the carrier frequency may be widely varied to obtain more detailed information related to the object OBJ to be measured. Also, according to further embodiments, the frequency of the control signals may be chosen to be constant (e.g., in combination with a constant or preferably a variable carrier frequency), so that an evaluation in the frequency range of the control signals is even further simplified. As an example, if filters or other means of signal processing are employed for measurement signals or processed signals in the frequency range of the control signals, the filters or other means of signal processing may specifically be designed for the constant frequency of the control signals thus further reducing complexity. As an example, according to further embodiments, a bandpass filter such as e.g. comprised in the combined filter and amplifier unit 137 of FIG. 6 may be employed, e.g. to prevent interference (e.g. resulting from external sources) on the error signal s_error, whereas for variable frequency of the control signals the bandpass filter would require a more complex structure for ensuring a tunable passband range and phase synchronicity.

As an example, when varying the carrier frequency of the carrier signals, due to frequency dependence of the skin depth of eddy currents induced by at least the first impedance 112 (FIG. 1) into the object OBJ, the depth of measurement within the object OBJ may be varied, thus e.g. enabling to detect hidden discontinuities or defects within the object OBJ. Also, a specific location, i.e. depth, of such hidden discontinuities or defects may be determined according to further embodiments.

According to further embodiments, multi-layer materials such as galvanized or electroplated objects OBJ comprising e.g. a base material (e.g., ferrous metal) and a top layer (e.g., electroplated zinc layer) may be analyzed. For example, the position, particularly depth, of a material interface between the base material and the electroplated layer may be precisely determined by using the principle according to the embodiments. According to further embodiments, other objects than solid bodies may also be analyzed, e.g. non-solid material such as fluids, for example emulsions, e.g. comprising oil and water. For example, density and/or attenuation measurements may be performed for such materials.

Figure 11A:
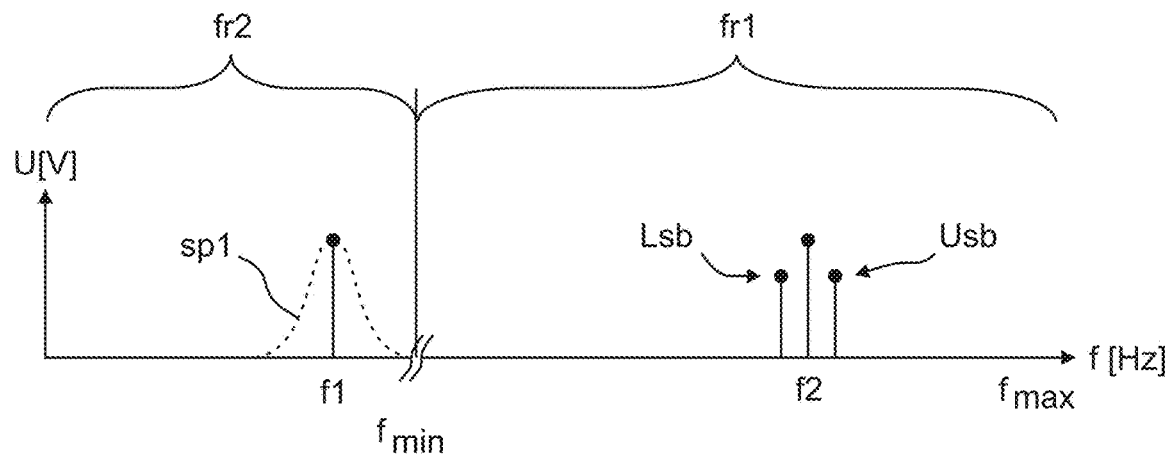

FIG. 11A schematically depicts operating frequencies and associated frequency ranges according to further embodiments. Reference sign f1 denotes a frequency of the control signals s_ctr11, s_ctr12, cf. e.g. FIG. 3, 5, and reference sign f2 denotes the carrier frequency of the carrier signals s_c1, s_c2. Sidebands of the amplitude modulated signals s_am1, s_am2 are indicated by reference signs usb, lsb. A first frequency range within which the carrier frequency of the carrier signals s_c1, s_c2, cf. reference sign f2, may be varied according to some embodiments is indicated by reference sign fr1, the first frequency range fr1 ranging between a minimum frequency fmin and a maximum frequency fmax. A second frequency range fr2, which comprises spectral components f1 of the control signals s_ctr11, s_ctr12, ranges between a frequency of 0 Hz and the minimum frequency fmin. According to further preferred embodiments, the minimum frequency fmin may be chosen such that fmin−f1 is large enough to accommodate the spectrum sp1 of the control signals s_ctr11, s_ctr12, which may e.g. depend on a filter characteristic of the filters F1, F2. Generally, it is preferable to choose the frequencies f1, f2 such that the spectra of the amplitude modulated signals s_am1, s_am2 do not overlap with the spectrum sp1.

Figure 11B:
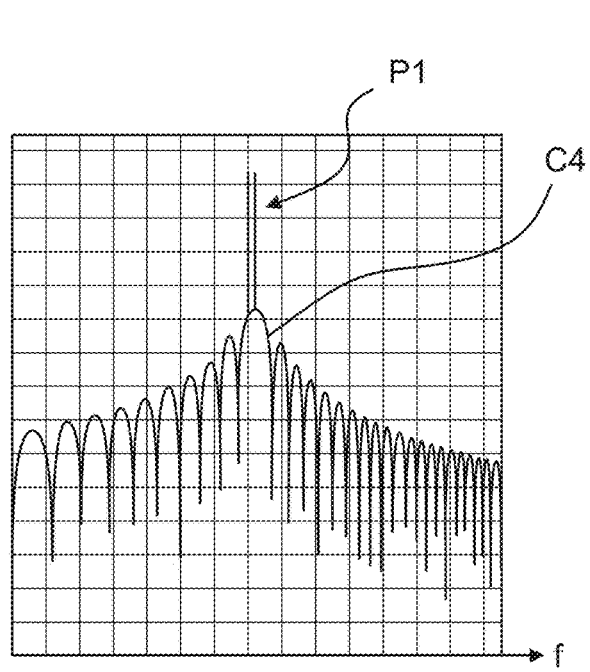
Figure 11C:
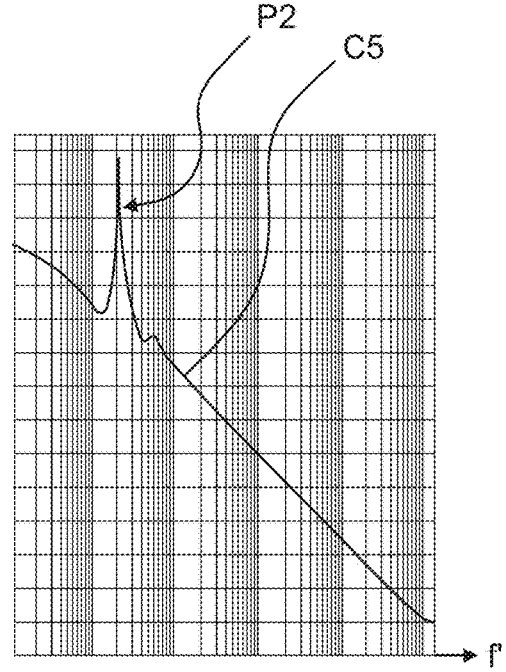

Curve C4 of FIG. 11B schematically depicts a spectral plot of the amplitude modulated signals s_am1, s_am2 as e.g. obtained by the signal generator 120a of FIG. 3. It can be seen that peaks P1 are centered around about 100 kHz. Curve C5 of FIG. 11C schematically depicts a spectral plot of first processed signal s_p1 as obtained after envelope demodulation. It can be seen that a peak P2 is centered around about 2 kHz.

Figure 12:
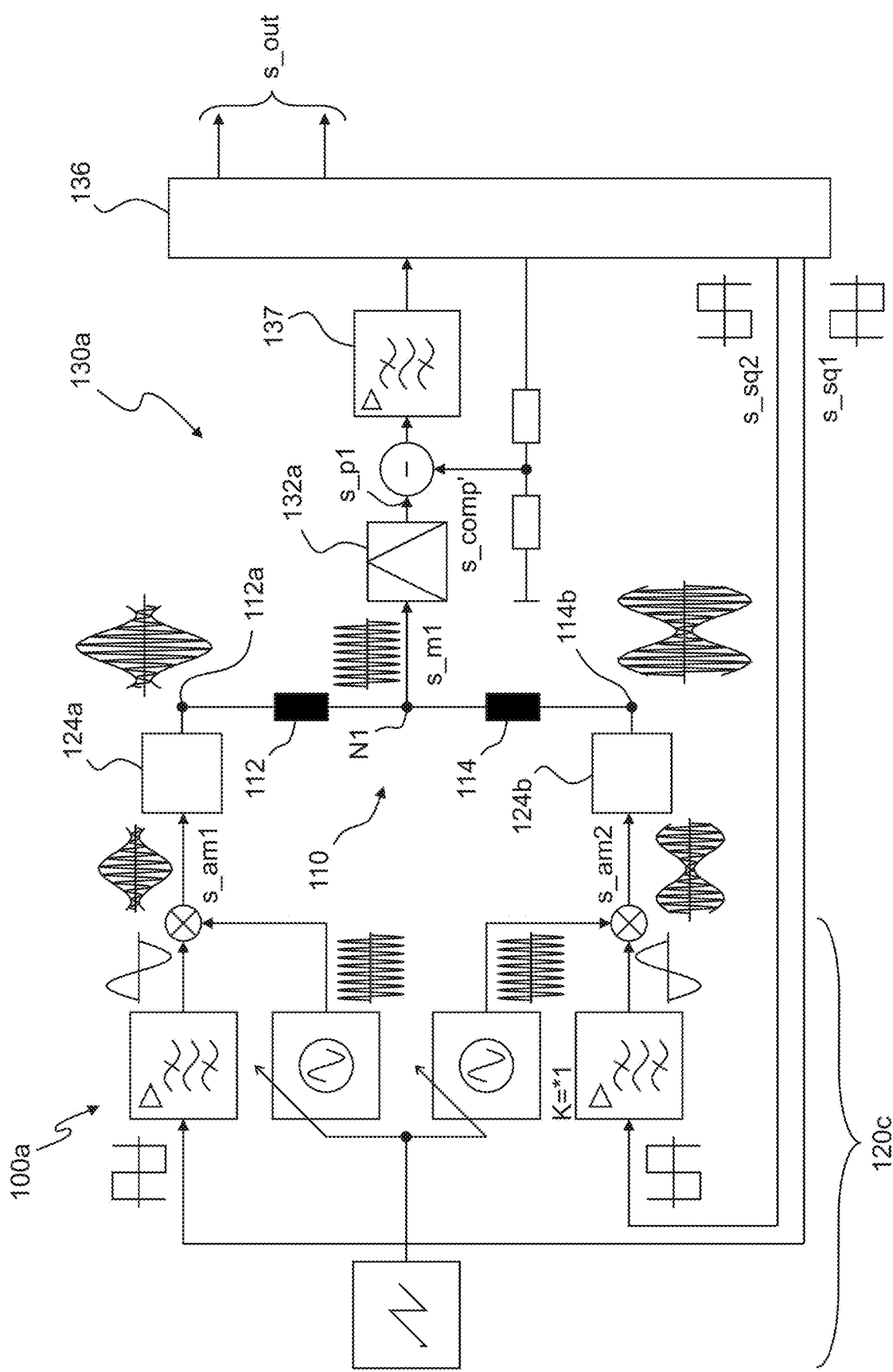

FIG. 12 schematically depicts a simplified block diagram of an apparatus 100a according to a further embodiment. The apparatus 100a comprises a signal generator 120c as explained above with reference to FIG. 5. The amplitude modulated signals s_am1, s_am2 provided by the signal generator 120c are amplified by respective amplifiers or drivers 124a, 124b, and the so obtained amplified amplitude modulated signals are provided to the terminals 112a, 114b, leading to a sum signal at node N1 corresponding to the first measurement signal s_m1. The first measurement signal s_m1 is envelope demodulated by envelope demodulator 132a to obtain the first processed signal s_p1. The apparatus 100a further comprises an evaluation device 130a as explained above with respect to FIG. 6, which is configured to determine a (usually complex) output signal s_out based on the first processed signal s_p1. According to further embodiments, the output signal s_p1 may e.g. be represented by a real part and an imaginary part and/or by polar coordinates and the like.

Figure 13:
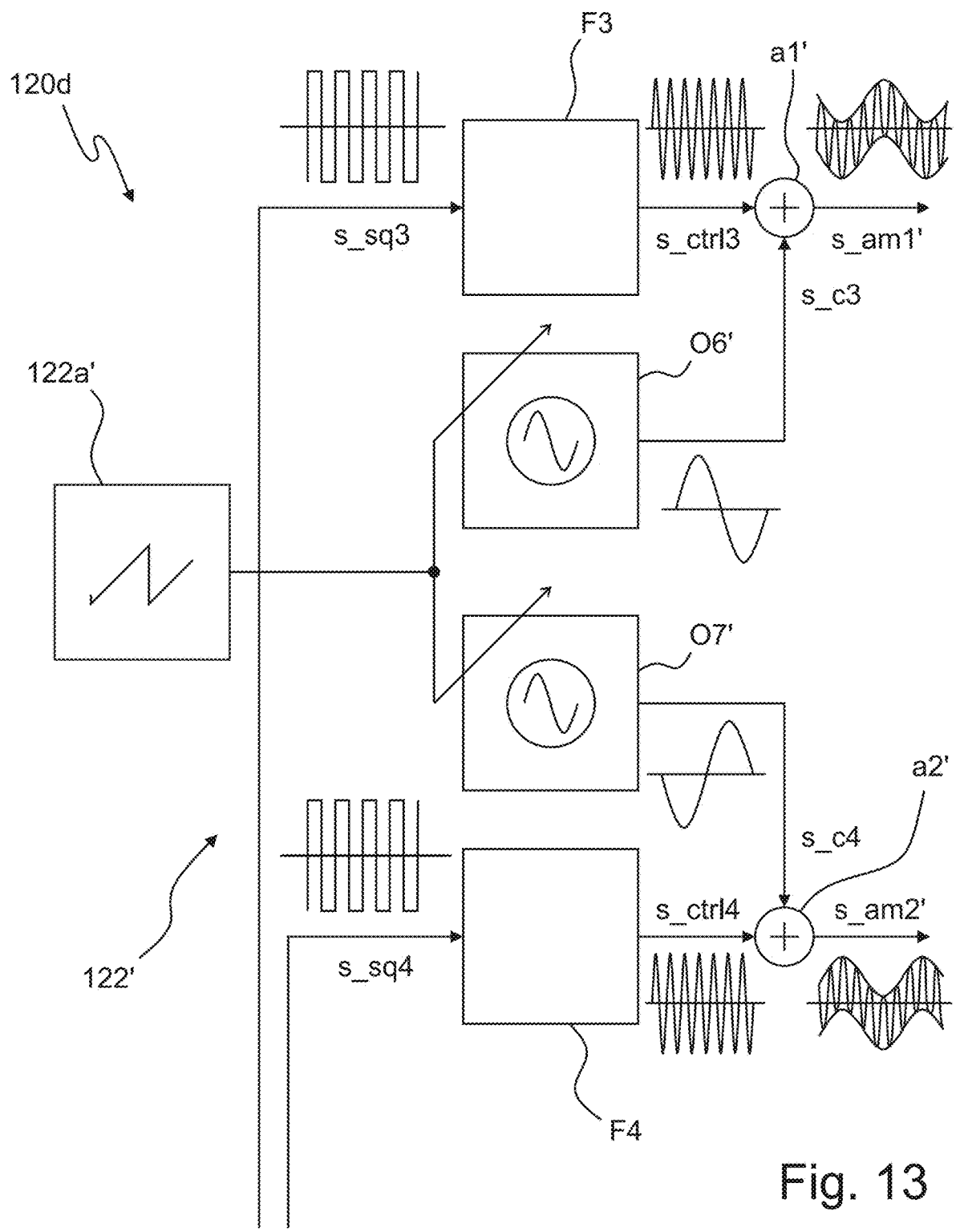

FIG. 13 schematically depicts a simplified block diagram of a signal generator 120d according to a further embodiment. Similar to the signal generator 120b explained above with reference to FIG. 4, the signal generator 120d of FIG. 13 provides amplitude modulated signals s_am1', s_am2' which are obtained by adding respective third and fourth carrier signals s_c3, s_c4 with respective third and fourth control signals s_ctr13, s_ctr14 each by means of the adders a1', a2'. According to the present embodiment, the third control signal s_ctr13, which is preferably a sinusoidal signal, is derived from a third square wave signal s_sq3 by means of a third filter F3, preferably a bandpass filter, and the fourth control signal s_ctr14, which is preferably also a sinusoidal signal, is derived from a fourth square wave signal s_sq4 by means of a fourth filter F4, preferably also a bandpass filter.

According to further preferred embodiments, the third and fourth square wave signals s_sq3, s_sq4 comprise a relative phase shift of 0 degrees, i.e. having the same phase, and the third and fourth filters F3, F4 are configured such that they have the same characteristic and that they preserve the relative phase shift of 0 degrees. In other words, the sinusoidal control signals s_ctr13, s_ctr14 obtained by the filters F3, F4 comprise the same frequency and the desired phase shift of presently 0 degrees.

According to further preferred embodiments, the third and fourth carrier signals s_c3, s_c4 may be provided by a sweep generator arrangement 122' comprising controllable oscillators O6', O7' that provide a preferably sinusoidal output signal each in form of the carrier signals s_c3, s_c4 under control of a sawtooth generator 122a'. Similar to the configuration 120b of FIG. 4, the carrier signals s_c3, s_c4 of the oscillators O6', O7' according to FIG. 13 have a predetermined relative phase shift, the phase shift preferably being 180 degrees. Using the sweep generator arrangement 122' advantageously enables to provide third and fourth carrier signals s_c3, s_c4 with different or generally time-varying frequency thus enabling to perform measurements related to the object OBJ to be measured at respective different carrier frequencies.

According to further preferred embodiments, similar to the first and second square wave signals s_sq1, s_sq2 as explained above with reference to FIG. 5, the square wave signals s_sq3, s_sq4 of FIG. 13 may be provided by the evaluation device 130, cf. FIG. 1, also cf. reference numeral c1 of FIG. 1.

Figure 14:
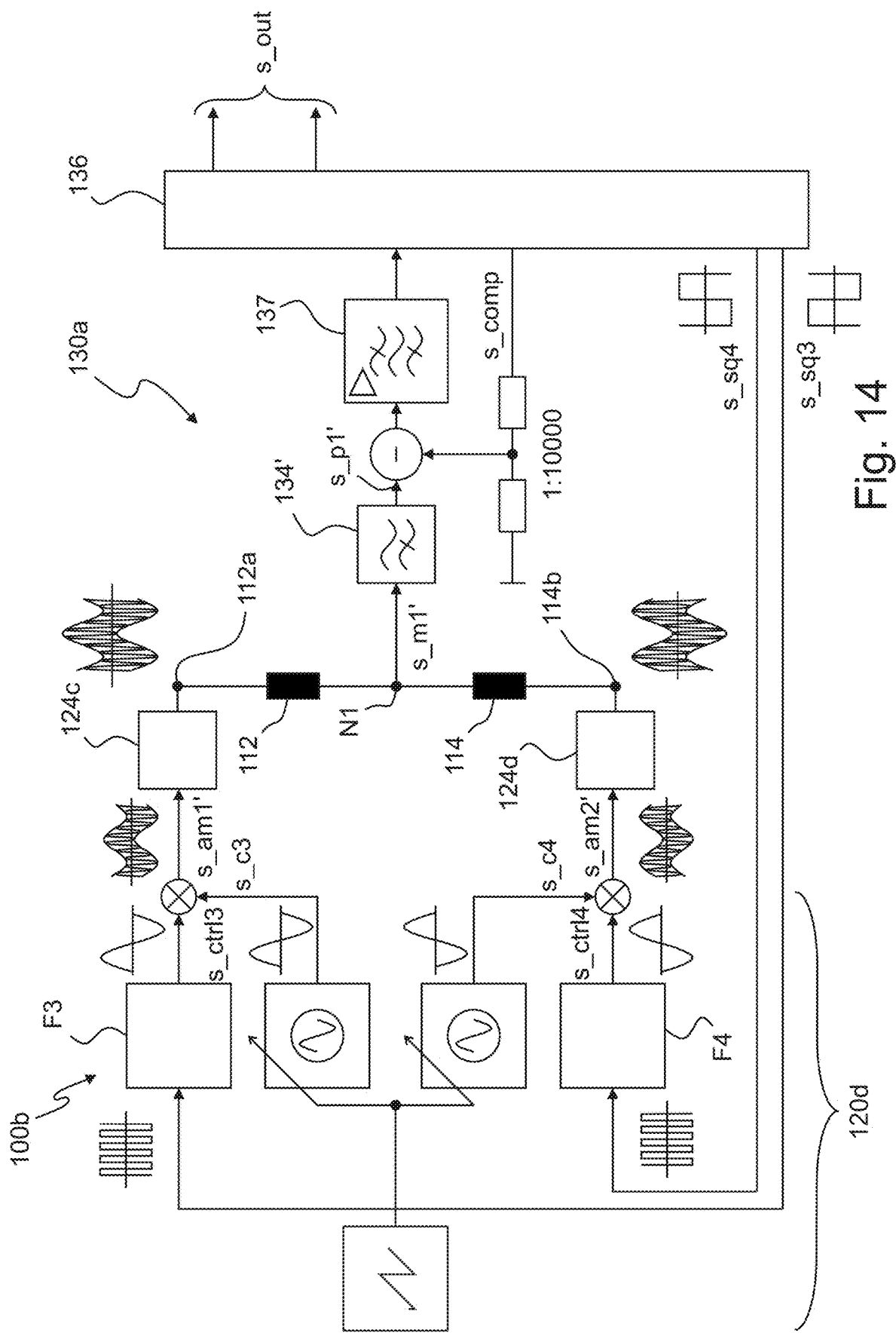

FIG. 14 schematically depicts a simplified block diagram of an apparatus 100b according to a further embodiment. The apparatus 100b comprises a signal generator 120d as explained above with reference to FIG. 13. The amplitude modulated signals s_am1', s_am2' provided by the signal generator 120c are amplified by respective amplifiers or drivers 124c, 124d, and the so obtained amplified amplitude modulated signals are provided to the terminals 112a, 114b, leading to a sum signal at node N1 corresponding to the first measurement signal s_m1'. The first measurement signal s_m1' is filtered by a high-pass filter 134' to obtain the first processed signal s_p1'. Advantageously, and in contrast to the embodiments explained above with respect to FIG. 12, no envelope demodulator 132a is required for the determination of the first processed signal s_p1' according to the embodiments explained with reference to FIG. 14. The apparatus 100a further comprises an evaluation device 130a as explained above with respect to FIG. 6, which is configured to determine a (usually complex) output signal s_out based on the first processed signal s_p1'. Also, according to further preferred embodiments, the evaluation device 130a provides the third and fourth square wave signals s_sq3, s_sq4 to the signal generator 120d. According to further preferred embodiments, a signal portion of the first processed signal s_p1' corresponding to the carrier signal frequency of the employed carrier signals s_c3, s_c4 may be removed by the evaluation device 130a.

According to further embodiments, it is also possible to provide an optional further high-pass filter for eliminating the carrier signal from the first measurement signal s_m1'. As an example, the optional further high-pass filter may comprise an operational amplifier, may receive an amplified version of the second amplitude modulated signal s_am2' as provided to the second terminal 114b of the second impedance 114, and an output of the optional further high-pass filter may be subtracted by means of a subtractor (not shown) from the first measurement signal s_m1'. Advantageously, this results in a lower load for the closed-loop control provided by the evaluation device 130a as the removal of the carrier signal frequencies has the effect that the first processed signal s_p1' is a vanishing in the tuned state (i.e., absence of the object OBJ to be measured) of the apparatus 100b, instead of comprising carrier signal components.

According to further embodiments, the above explained optional further high-pass filter is not provided, and the closed-loop control of the evaluation device 130a may be configured to remove carrier signal components from the first processed signal s_p1', i.e. in addition to compensating the first processed signal s_p1' to attain the desired vanishing signal. In these embodiments, the compensation signal s_comp may also comprise spectral components related to the carrier signals.

According to further preferred embodiments, the carrier frequency of the third and fourth carrier signals s_c3, s_c4 of the signal generator 120d as used within the apparatus 100b exemplarily depicted by FIG. 14, is smaller than a frequency of the third and fourth control signals s_ctr13, s_ctr14. This way, measurements related to the object OBJ may be made using the (lower) frequency range of the carrier signals s_c3, s_c4, and results obtained thereby, e.g. in form of a detuned first measurement signal s_m1', may be transformed to the (higher) frequency range of the third and fourth control signals s_ctr13, s_ctr14. In this respect, according to further embodiments and similar to the embodiments explained above with reference to FIG. 3, 12, amplitude and/or phase information of the detuned first measurement signal s_m1' may be transferred into another frequency range, presently the frequency range of the control signals s_ctr13, s_ctr14 for efficient evaluation.

Further advantageously, filters 134', 137 that may be provided according to preferred embodiments, may be designed for the frequency range of the control signals s_ctr13, s_ctr14, rather than the (presently lower) frequency range of the carrier signals s_c3, s_c4. Further advantages of measurements with a comparatively low frequency, as enabled by preferred embodiments according to FIG. 14, relate to the ability to detect discontinuities or defects in the object OBJ to be measured in greater depths, due to the increased skin-depth related to the comparatively low measurement frequency.

Figure 15A:
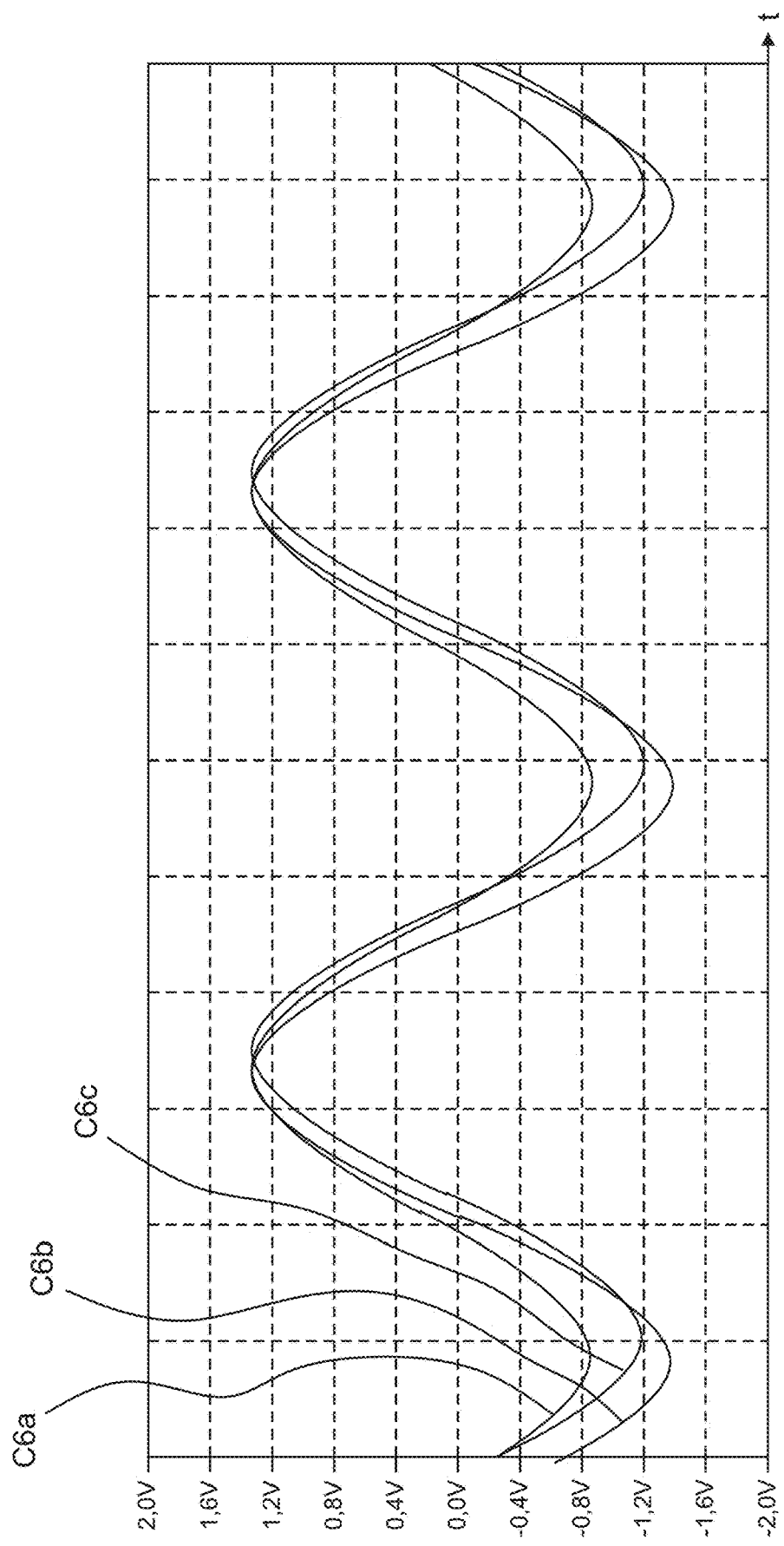

FIG. 15A schematically depicts signals according to further preferred embodiments. Curve C6a represents an output signal s_out as obtained by the apparatus 100b according to FIG. 14 in a tuned state, i.e. the absence of an object OBJ to be measured. The sinusoidal shape of curve C6a results from a spectral component corresponding with the carrier signal used by the apparatus 100b.

The further curve C6b represents an output signal s_out as obtained by the apparatus 100b when influencing the series connection 110 or the first impedance 112 of the series connection 110, respectively, with diamagnetic material, for instance by moving an object comprising aluminium towards the first impedance 112. As can be seen, in contrast to the first curve C6a, the second curve C6b comprises similar or identical phase, but modified amplitude, which is due to eddy currents resulting in the aluminum body of the object.

The further curve C6c represents an output signal s_out as obtained by the apparatus 100b when influencing the series connection 110 or the first impedance 112 of the series connection 110, respectively, with ferrous metal material, for instance by moving an object comprising iron towards the first impedance 112. As can be seen, in contrast to the first and second curves C6a, C6b, the third curve C6c expectedly comprises a non-vanishing phase shift with respect to the first curve C6a.

FIG. 15B schematically depicts signals according to further embodiments. The signals depicted by FIG. 15B have been obtained by subtracting a processed signal of the evaluation device 130a in the tuned state, i.e. only comprising spectral components of the carrier signal, from the respective processed signals as obtained in a detuned state, wherein for example diamagnetic material and/or ferrous metal material is present in the proximity of the first impedance 112. In this regard, curve C7a represents a difference signal where the series connection 110 is detuned by providing aluminum material to the first impedance 112, and curve C7b represents a different signal where detuning is performed by providing iron to the first impedance 112. Note that the reduced signal amplitudes of the signals exemplarily depicted by FIG. 15B result from the fact that, as mentioned above, the carrier signal components have been subtracted, which results in a significantly reduced load for the closed-loop control of the evaluation unit 130a.

Figure 16:
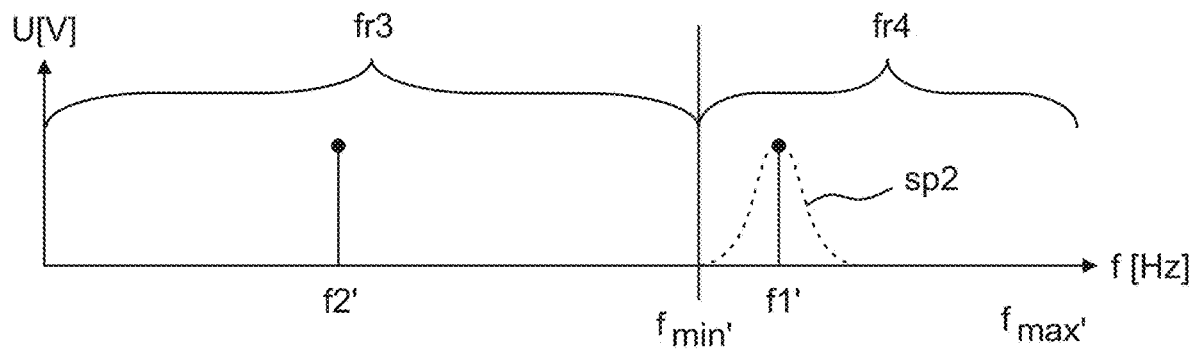

FIG. 16 schematically depicts operating frequencies and associated frequency ranges according to further embodiments, which are particularly suited for the operation of the apparatus 100b as exemplarily by FIG. 14. Reference sign f1' denotes a frequency of the control signals s_ctr13, s_ctr14, cf. e.g. FIG. 4, and reference sign f2' denotes the carrier frequency of the carrier signals s_c3, s_c4. A third frequency range within which the carrier frequency of the carrier signals s_c3, s_c4, cf. reference sign f2', may be varied according to preferred embodiments, is indicated by reference sign fr3. A fourth frequency range fr4, which comprises spectral components f1' of the control signals s_ctr13, s_ctr14, ranges between a frequency fmin' a frequency fmax'. A spectral characteristic of the optional band-pass filter 137 (FIG. 14) is schematically depicted by reference sign sp2. According to further preferred embodiments, the frequency ranges fr3, fr4 may be chosen such that the spectral characteristic sp2 does not overlap with the frequency f2'.

According to further embodiments, the apparatus 100 (FIG. 1) is configured to operate in different operating modes, preferably in a time-multiplexed manner. This is exemplarily depicted by the state diagram of FIG. 17. In a first state or operating mode M1, the apparatus 100 is configured to at least temporarily obtain the first amplitude modulated signal s_am1 and the second amplitude modulated signal s_am2 as exemplarily explained above with reference to FIG. 3 and/or FIG. 5 and/or FIG. 12. I.e., in the first state M1, the signal generator 120 (FIG. 1) may operate according to FIG. 3 or FIG. 5 or FIG. 12.

By contrast, in a second state or operating mode M2 (FIG. 17) the apparatus 100 is configured to at least temporarily obtain the first amplitude modulated signal s_am1' and the second amplitude modulated signal s_am2' as exemplarily explained above with reference FIG. 4 or FIG. 13 or FIG. 14. I.e., in the second state M2, the signal generator 120 (FIG. 1) may operate according to FIG. 4 or FIG. 13 or FIG. 14. According to further embodiments, a respective operational flexibility of the signal generator 120 may be obtained by providing at least some, preferably all of the involved signals s_am1, s_am2, s_am1', s_am2' by means of DDS (direct digital synthesis) techniques. As an example, according to further particularly preferred embodiments, a corresponding DDS circuit 1200 may be provided e.g. in the signal generator 120. According to further embodiments, however, the DDS circuit 1200 may also be comprised within the evaluation unit 130 and/or at least partly implemented by using one or more components of the evaluation unit 130. As an example, according to further embodiments, DDS techniques may be employed which comprise hardware components as well as software components, wherein the respective software components according to further embodiments may e.g. be implemented in form of a computer program for the calculating unit 1362 of the control unit 136.

Figure 17:
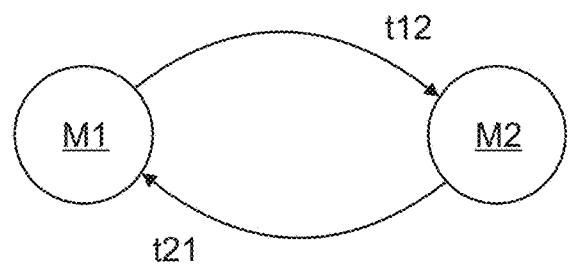

State transitions between the operating modes M1, M2 (FIG. 17) are indicated with reference signs t12, t21 of FIG. 17. According to further embodiments, more than the two exemplarily depicted operating modes M1, M2 may be provided. As an example, according to further embodiments, one or more operating modes may be provided in which measurements are performed by using a basically constant carrier frequency for the carrier signals, whereas one or more further operating modes may be comprised in which carrier signals with time-varying carrier frequency are employed. According to further embodiments, it is also possible to provide several operating modes, wherein the signal generator operates e.g. according to FIG. 3, wherein in some of these operating modes a constant carrier frequency is used, and wherein in some other of these operating modes a non-constant carrier frequency is used. Similarly, according to further embodiments, it is also possible to provide several further operating modes, wherein the signal generator operates e.g. according to FIG. 4, wherein in some of these further operating modes a constant carrier frequency is used, and wherein in some other of these further operating modes a non-constant carrier frequency is used.

According to further embodiments, as an example, an operation comprising non-constant carrier frequency may be obtained by the sawtooth generator arrangement 122 as exemplarily depicted by FIG. 5. According to further embodiments, other configurations are also possible for providing non-constant carrier frequencies.

Figure 18:
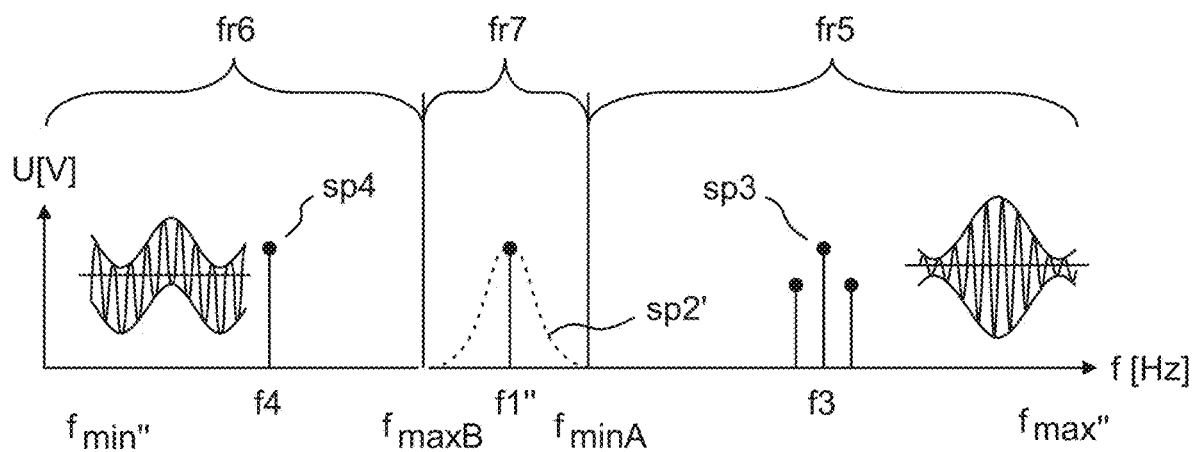

Turning now to FIG. 18, reference sign f1" represents a system frequency according to further particularly preferred embodiments. As an example, the square wave signals s_sq1, s_sq2 as e.g. generated by control circuit 136 exemplarily depicted by FIG. 6 and/or the square wave signals s_sq3, s_sq4 as e.g. generated by control circuit 136 exemplarily depicted by FIG. 14 may comprise a fundamental frequency which is basically identical to the system frequency f2" as exemplarily depicted by FIG. 18. Reference sign sp2' indicates a frequency characteristic of a bandpass filter related to the system frequency, cf. e.g. reference sign 137 of FIG. 12.

According to preferred embodiments, the system frequency f2" may e.g. comprise 10 kHz (kilohertz). According to other preferred embodiments, the system frequency f2" may e.g. comprise 1 kHz. However, according to further embodiments, other frequency values and/or frequency ranges (higher or lower) are also possible for the system frequency.

According to further embodiments, reference sign fry indicates a frequency range within which a third frequency f3 may be varied according to a first mode M1 (FIG. 17) of operation. As an example, in the first mode M1 of operation, the signal generator 120 of the apparatus operates basically in accordance with the configuration 120a exemplarily depicted by FIG. 3, and the third frequency f3 corresponds with a carrier frequency of the respective carrier signals s_c1, s_c2. Further correspondingly, reference sign sp3 exemplarily depicts a spectrum of the amplitude modulated signals as used in the first mode M1 of operation.

According to further embodiments, reference sign fr6 indicates a frequency range within which a fourth frequency f4 may be varied according to a second mode M2 (FIG. 17) of operation. As an example, in the second mode M2 of operation, the signal generator 120 of the apparatus operates basically in accordance with the configuration 120b exemplarily depicted by FIG. 4, and the fourth frequency f4 corresponds with a carrier frequency of the respective carrier signals s_c3, s_c4. Further correspondingly, reference sign sp4 exemplarily depicts a spectrum of the amplitude modulated signals as used in the second mode M2 of operation.

According to further particularly preferred embodiments, depending on the respective mode of operation M1, M2, a carrier frequency for performing the measurements according to the principle of the embodiments may be arbitrarily varied (even dynamically, e.g. within one specific measurement, according to preferred embodiments) within an overall frequency range defined by minimum frequency fmin" and a maximum frequency fmax", the overall frequency range inter alia covering the frequency ranges fry, fr6 as explained above. Frequency variation may, according to further preferred embodiments, e.g. be obtained by sweeping or any other suitable technique such as e.g. selecting in a time-multiplexed manner different distinct frequencies within a the overall frequency range.

This way, frequency-dependent information of the object OBJ to be measured may be gained, such as e.g. related to electric and/or magnetic conductivity (i.e., permeability) and/or skin depth and/or polarisation and/or dipole moment excitation within dipole molecules, and may be efficiently evaluated e.g. in the frequency range associated with the control signals s_ctr11, . . . , s_ctr14, i.e. the system frequency f1".

According to further embodiments, exemplary values for the minimum frequency fmin" may e.g. comprise about 100 Hz (Hertz) or less, and exemplary values for the maximum frequency fmax" may e.g. comprise about 100 MHz (megahertz). Alternatively, maxim frequencies in the GHz range are also possible according to further embodiments. As an example, the series connection 110 comprising first impedance 112 and second impedance 114, may e.g. be operated within an overall frequency range covering frequencies between 100 Hz and 100 MHz. As a further example, the first impedance 112 may e.g. comprise an inductive element an impedance of which depends on the physical parameter to be measured.

According to further preferred embodiments, when varying the measurement frequency, the frequency range fr7 may be avoided. In other words, the carrier frequency for either mode of operation may be selected such that it is not comprised by the seventh frequency range fr7. According to further embodiments, the seventh frequency range fr7 is basically defined by the frequency characteristic sp2' of the bandpass filter 137, based on the control signals s_ctr11, s_ctr12, s_ctr13, s_ctr14.

Figure 19:
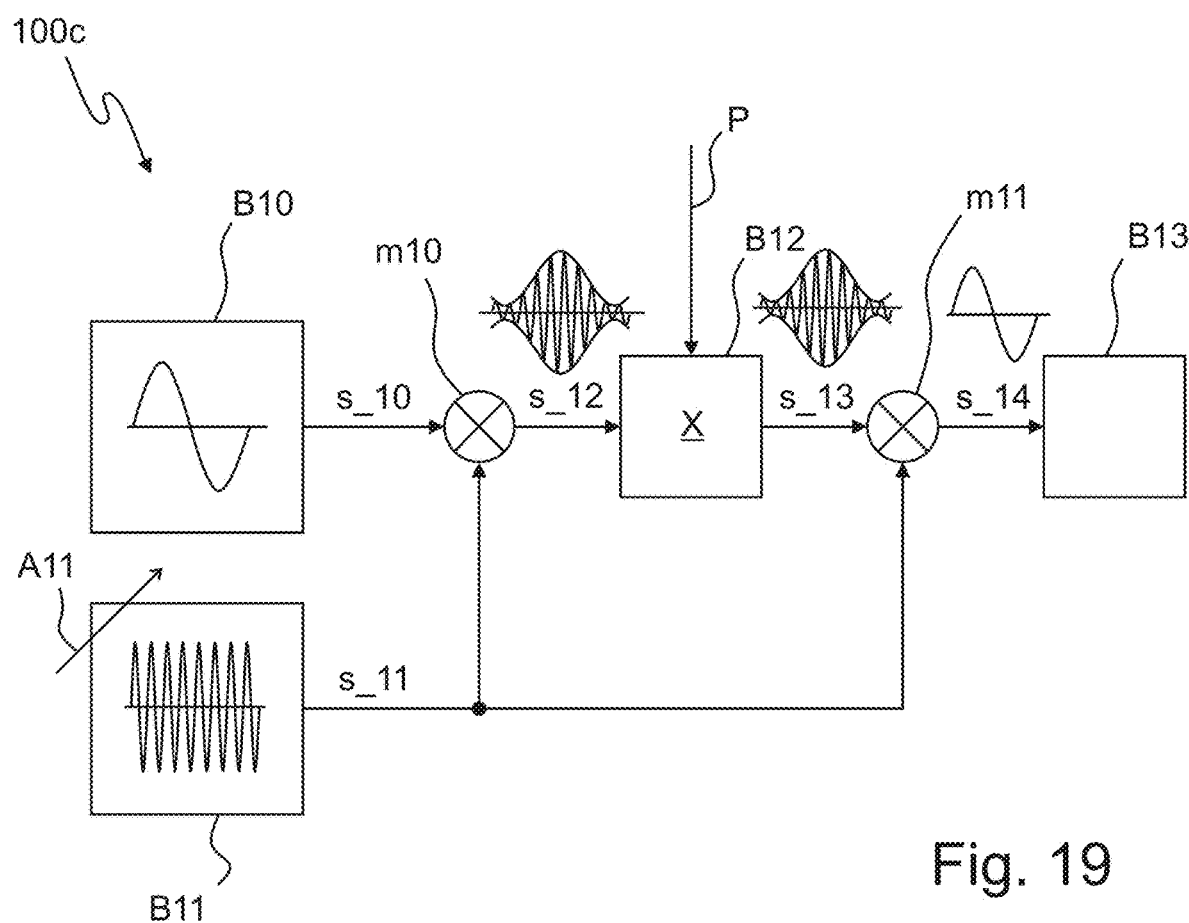

FIG. 19 schematically depicts a simplified block diagram of an apparatus 100c according to further embodiments. Block B10 provides a signal s10, which is preferably a sinusoidal signal, and block B11 provides a signal s11, which is preferably also a sinusoidal signal, preferably with a variable frequency, cf. the arrow A11. A multiplier m10 effects amplitude modulation of the signal s10 by means of signal s11, wherein signal s11 represents a carrier frequency for the amplitude modulation, and wherein an amplitude modulated signal s12 is obtained at an output of the multiplier m10. Block B12 represents a sensor element for example comprising at least one impedance X depending on at least one physical parameter P to be measured. Block B12 receives signal s12 as input signal and outputs an output signal s13 an amplitude and/or phase of which has been altered with respect to the input signal s12 depending on the impedance X and the parameter P. The output signal s13 is demodulated or downconverted, respectively, by multiplying it with the signal s11 via a further multiplier m11, thus obtaining a demodulated signal s14 at an output of the multiplier m11. The demodulated signal s14 advantageously comprises information on the altered amplitude and/or phase of the signal s13 with respect to the input signal s12 depending on the physical parameter P, and thus also information on the physical parameter P. The demodulated signal s14 may be evaluated by an evaluation circuit schematically depicted by block B13 of FIG. 19.

Similar to the impedances 112, 114 of the embodiments explained above with reference to FIG. 1 to FIG. 18, the sensor element B12 may comprise at least one inductive element and/or a capacitive element and/or a resistive element and/or an optical element and/or any other element an impedance of which depends on the physical parameter P to be measured. According to further embodiments, the sensor element B12 may comprise any combination of two or more of the aforementioned elements.

The principle according to the embodiments, which may e.g. be used by any of the exemplarily explained apparatus 100 and/or 100a and/or 100b and/or 100c, offers at least the following advantages:

Amplitude and/or phase information of the amplitude-modulated signals s_am1, s_am2, s_am1', s_am2', s_am3, s_am4, s12, which may e.g. be influenced by the physical parameter P to be measured, may be conveyed to the evaluation device 130 (FIG. 1) (and/or to the evaluation circuit B13, cf. FIG. 19) within a system frequency which in many cases comprises lower frequencies as compared to the respective carrier signals of the amplitude-modulated signals. Advantageously, signal processing components or generally all components of the evaluation device 130 (FIG. 1) (and/or to the evaluation circuit B13, cf. FIG. 19) may be designed for the system frequency and are not required to be configured for processing signals in other frequency ranges. In many cases, signal processing is less complex in a frequency range comprising the system frequency, as compared to higher frequencies.

Advantageously, for particularly high carrier frequencies, providing the signal processing within a frequency range comprising the system frequency enables a precise evaluation of the parameter to be measured, e.g. a predetermined precision, which may not be possible with commercially available components at the particularly high carrier frequencies.

Especially when using one or more inductive elements for the series connection 110 (FIG. 1) and/or the sensor element B12 (FIG. 19), as the skin depth is inter alia frequency dependent, a depth of measurement within the object OBJ to be measured may be controlled by providing one or more different, predetermined carrier frequencies. This way, as an example, depth information e.g. related to discontinuities of the object OBJ to be measured and/or its surface or deeper layers may be obtained.

When using one or more inductive elements for the series connection 110 (FIG. 1) and/or the sensor element B12 (FIG. 19), layers of different materials with different electric and/or magnetic properties may be determined and/or characterized. As an example, when considering an object OBJ to be measured which comprises a ferrous metal as a base material and e.g. an electroplated surface layer (comprising zinc, for example) arranged on the surface of the base material, by selecting the carrier frequency for measurement according to the principles of the embodiments, individual measurements may be made for the base material and the electroplated surface layer ("duplex measurements"), which even enables to provide a calibration-free measurement technique. Advantageously, the principle according to the embodiments enables to determine the permeability of the base material, e.g. without any influence of the zinc layer, and to determine the electric conductivity of the zinc layer, e.g. without any influence of the base material.

According to further embodiments, particularly if using one or more capacitive elements for the series connection 110 (FIG. 1) and/or the sensor element B12 (FIG. 19), and especially with higher carrier frequencies, molecular resonances of the object OBJ to be measured may be detected, especially employing absorption-based methods.

According to further embodiments, as different metals comprise different electrical conductivity and/or permeability, based on the output signal s_out, a distinction between different metal materials may be made, especially independent of a distance between the first impedance 112 (FIG. 1) and/or the sensor element B12 (FIG. 19) and/or independent of a geometry of the object OBJ.

According to further embodiments, moisture may be detected, especially using higher carrier frequencies. As an example, the object OBJ (FIG. 1) may also comprise a wall or a wooden object.

According to further embodiments, electric conductivity of the object OBJ may be measured at different frequencies within a single measurement, e.g. using a sweep of the carrier frequency as enable by the apparatus of FIG. 12. This way, corresponding measurements, which may e.g. be required in aviation industry, may be simplified.

According to further embodiments, the series connection 110 of the configurations explained above with reference to FIGS. 12 and/or 14 and/or the sensor element B12 may be modified such that e.g. a Wheatstone bridge (not shown) is obtained, e.g. by connecting in parallel to the series connection 110 a further series connection (not shown). In these embodiments, for example, the measurement signal s_m1 may be derived from the bridge voltage available at the intermediate nodes of the respective series connection. The further evaluation of a so obtained measurement signal may be performed as explained above with reference to FIG. 1 to FIG. 19.

What is claimed is:

1. An apparatus, comprising:
   a series connection of at least a first impedance and a second impedance,
     the first impedance including a first terminal and a second terminal and an impedance value of at least the first impedance depending on at least one physical parameter,
     the second impedance including a first terminal and a second terminal, and the second terminal of the first impedance being connected to the first terminal of the second impedance, forming a first node;
   a signal generator configured to apply a first amplitude modulated signal to the first terminal of the first impedance and configured to apply a second amplitude modulated signal to the second terminal of the second impedance; and
   an evaluation device configured to receive a first measurement signal from the first node and configured to determine information on the at least one physical parameter depending on the first measurement signal,
     wherein the signal generator is configured to
       at least temporarily obtain the first amplitude modulated signal by adding a first carrier signal having a carrier frequency with a periodic first control signal and
       at least temporarily obtain the second amplitude modulated signal by adding a second carrier signal having the carrier frequency with a periodic second control signal,
     wherein the second carrier signal has a first phase shift with respect to the first carrier signal,
     wherein the second control signal has a second phase shift with respect to the first control signal,
     wherein the first phase shift is 180 degrees, and
     wherein the second phase shift is zero.

2. The apparatus of claim 1, wherein the first amplitude modulated signal and the second amplitude modulated signal comprise a same carrier frequency.

3. The apparatus of claim 1, wherein the signal generator is configured to selectively provide the first amplitude modulated signal and the second amplitude modulated signal with a carrier frequency.

4. The apparatus of claim 1, wherein the signal generator is configured to at least one of
   at least temporarily obtain the first amplitude modulated signal by multiplying a first carrier signal, having the carrier frequency with the first control signal, the first control signal being a periodic first control signal, and
   at least temporarily obtain the second amplitude modulated signal by multiplying a second carrier signal, having the carrier frequency with the second control signal, the second control signal being a periodic second control signal, wherein the second carrier signal has the first phase shift with respect to the first carrier signal, wherein the second control signal has the second phase shift with respect to the first control signal.

5. The apparatus of claim 3, wherein the signal generator is configured to sweep the carrier frequency.

6. The apparatus of claim 1, wherein the evaluation device comprises at least one of an envelope demodulator, a bandpass filter, and a high-pass filter, for processing the first measurement signal, to obtain a first processed signal.

7. The apparatus of claim 6, wherein the evaluation device comprises a control circuit for providing a compensation signal, the compensation signal being determined such that a sum of the first processed signal and the compensation signal is zero.

8. The apparatus of claim 4, wherein at least one of the first phase shift and the second phase shift is 90 degrees or a multiple of 90 degrees.

9. A method of operating an apparatus including a series connection of at least a first impedance and a second impedance, the first impedance having a first terminal and a second terminal, wherein an impedance value of at least the first impedance depends on at least one physical parameter, wherein the second impedance has a first terminal and a second terminal, and wherein the second terminal of the first impedance is connected to the first terminal of the second impedance forming a first node, the method comprising:

applying, via a signal generator, a first amplitude modulated signal to the first terminal of the first impedance and applying a second amplitude modulated signal to the second terminal of the second impedance;

receiving, via an evaluation device, a first measurement signal from the first node; and determining information on the at least one physical parameter depending on the first measurement signal, wherein the signal generator at least temporarily obtains the first amplitude modulated signal by adding a first carrier signal having a carrier frequency with a periodic first control signal and at least temporarily obtains the second amplitude modulated signal by adding a second carrier signal having the carrier frequency with a periodic second control signal, wherein the second carrier signal has a first phase shift with respect to the first carrier signal, and wherein the second control signal has a second phase shift with respect to the first control signal, wherein the first phase shift is 180 degrees, and wherein the second phase shift is zero degrees.

10. The method of claim 9, wherein the first amplitude modulated signal and the second amplitude modulated signal include a same carrier frequency.

11. The method of claim 9, wherein the signal generator selectively provides the first amplitude modulated signal and the second amplitude modulated signal with a carrier frequency.

12. The method of claim 9, wherein the signal generator at least temporarily obtains the first amplitude modulated signal by multiplying a first carrier signal having the carrier frequency with the first control signal, the first control signal being a periodic first control signal and at least temporarily obtains the second amplitude modulated signal by multiplying a second carrier signal having the carrier frequency with the second control signal, the second control signal being a periodic second control signal, wherein the second carrier signal has the first phase shift with respect to the first carrier signal, and wherein the second control signal has the second phase shift with respect to the first control signal.

13. The method of claim 9, wherein the evaluation device processes the first measurement signal via at least one of an envelope demodulator, a bandpass filter and a high-pass filter, to obtain a first processed signal.

14. The method of claim 13, wherein the evaluation device provides, via a control circuit, a compensation signal, and wherein the compensation signal is determined such that a sum of the first processed signal and the compensation signal is zero.

15. The method of claim 9, wherein the applying, receiving, and determining are repeated for a number of measurements, and wherein for each of the number of measurements, a different carrier frequency is used.

16. The method of claim 11, wherein the signal generator sweeps the carrier frequency.

17. The method of claim 12, wherein at least one of the first phase shift and the second phase shift is 90 degrees or a multiple of 90 degrees.

18. An apparatus for measuring at least one physical parameter, comprising:

a sensor element including at least a first impedance including an impedance value depending on the at least one physical parameter;

a signal generator configured to apply an amplitude modulated signal to the at least first impedance of the sensor element, the amplitude modulated signal including a first amplitude modulated signal and a second amplitude modulated signal;

a demodulator for demodulating an output signal of the sensor element to obtain a demodulated signal; and an evaluation circuit configured to evaluate the demodulated signal, wherein the signal generator is configured to at least temporarily obtain the first amplitude modulated signal by adding a first carrier signal having a carrier frequency with a periodic first control signal and at least temporarily obtain the second amplitude modulated signal by adding a second carrier signal having the carrier frequency with a periodic second control signal, wherein the second carrier signal has a first phase shift with respect to the first carrier signal, wherein the second control signal has a second phase shift with respect to the first control signal, wherein the first phase shift is 180 degrees, and wherein the second phase shift is zero.

* * * * *